(12) United States Patent
Araki et al.

(10) Patent No.: US 9,927,735 B2
(45) Date of Patent: Mar. 27, 2018

(54) IMAGE FORMING APPARATUS THAT DIVIDES ONE PIXEL INTO PLURALITY OF PIXEL PIECES AND PERFORMS EXPOSURE ON PIXEL PIECE-BY-PIXEL PIECE BASIS

(71) Applicant: CANON KABUSHIKI KAISHA, Tokyo (JP)

(72) Inventors: Go Araki, Suntou-gun (JP); Hiroyuki Yamazaki, Mishima (JP); Takaomi Uezono, Suntou-gun (JP); Hidenori Kanazawa, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/489,450

(22) Filed: Apr. 17, 2017

(65) Prior Publication Data

US 2017/0315465 A1    Nov. 2, 2017

(30) Foreign Application Priority Data

Apr. 28, 2016   (JP) .................................. 2016-091656
Nov. 25, 2016   (JP) .................................. 2016-229191

(51) Int. Cl.
    *G03G 15/00*     (2006.01)
    *G03G 15/043*    (2006.01)
    *H04N 1/12*      (2006.01)
    *H04N 1/21*      (2006.01)

(52) U.S. Cl.
    CPC ......... *G03G 15/043* (2013.01); *H04N 1/1215* (2013.01); *H04N 1/2166* (2013.01)

(58) Field of Classification Search
    USPC ...... 399/1, 3, 4, 118, 177, 194, 198; 358/1.9
    See application file for complete search history.

(56) References Cited

U.S. PATENT DOCUMENTS

| 4,532,552 | A  | 7/1985  | Uno ............................... 358/302 |
| 7,675,532 | B2 | 3/2010  | Iida et al. ...................... 347/132 |
| 8,891,092 | B2 | 11/2014 | Nakamura ............... B41J 2/471 |
| 9,104,132 | B2 | 8/2015  | Iida et al. ............ G03G 15/043 |
| 9,319,553 | B2 * | 4/2016 | Kawana ................... H04N 1/04 |

(Continued)

FOREIGN PATENT DOCUMENTS

| JP | S58-125064 | 7/1983 |
| JP | H02-131212 | 5/1990 |

(Continued)

OTHER PUBLICATIONS

U.S. Appl. No. 15/497,060, filed Apr. 25, 2017.

*Primary Examiner* — Hoan Tran
(74) *Attorney, Agent, or Firm* — Fitzpatrick, Cella, Harper & Scinto

(57) ABSTRACT

An image forming apparatus includes: a photosensitive member; an exposure unit configured to divide one pixel into a plurality of pixel pieces and perform exposure on a pixel piece-by-pixel piece basis, to form an electrostatic latent image on the photosensitive member; a determination unit configured to determine, based on image data, an isolated pixel surrounded by blank pixels in the electrostatic latent image; a selection unit configured to select a correction target pixel from the blank pixels surrounding the isolated pixel; and a correction unit configured to correct the image data so as to expose a pixel piece of the correction target pixel.

19 Claims, 22 Drawing Sheets

(56) References Cited

U.S. PATENT DOCUMENTS

| | | | |
|---|---|---|---|
| 9,575,314 B2 | 2/2017 | Araki | G02B 26/124 |
| 2009/0059255 A1* | 3/2009 | Ohide | H04N 1/1917 358/1.9 |
| 2016/0246208 A1 | 8/2016 | Nagasaki et al. | G03G 15/043 |
| 2016/0246209 A1 | 8/2016 | Watanabe et al. | G03G 15/043 |
| 2016/0370727 A1 | 12/2016 | Nakajima et al. | G03G 15/043 |

FOREIGN PATENT DOCUMENTS

| | | |
|---|---|---|
| JP | H10-173930 | 6/1998 |
| JP | 2003-305883 | 10/2003 |
| JP | 2005-193589 | 7/2005 |
| JP | 2012-121242 | 6/2012 |
| JP | 2015-087622 | 5/2015 |
| JP | 2016-000510 | 1/2016 |

* cited by examiner

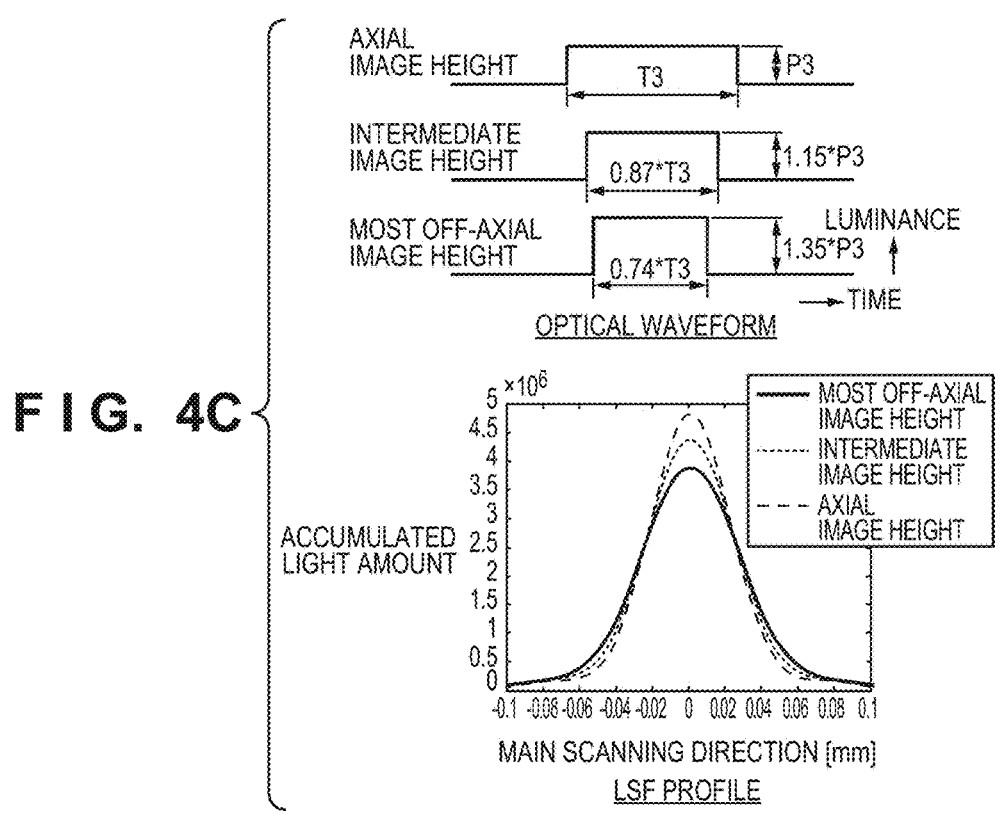

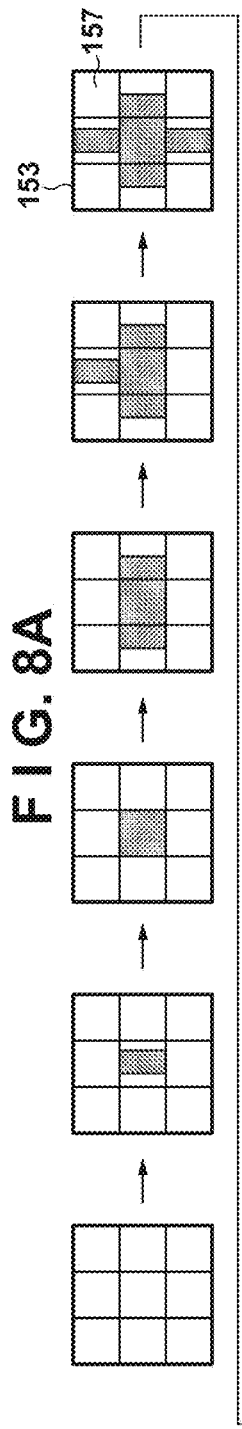
FIG. 8A
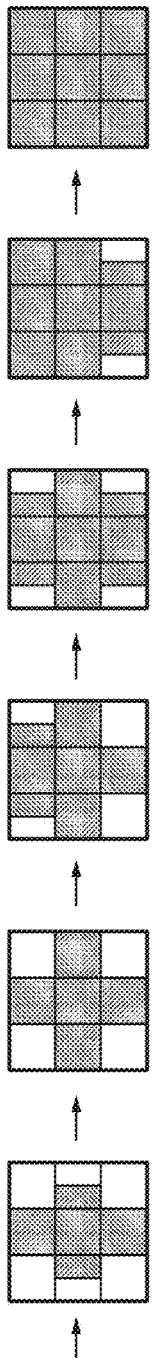
FIG. 8B
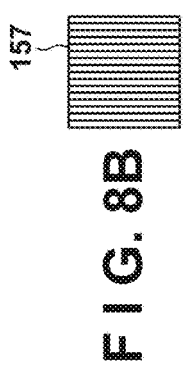
FIG. 8C  FIG. 8D  FIG. 8E  FIG. 8F
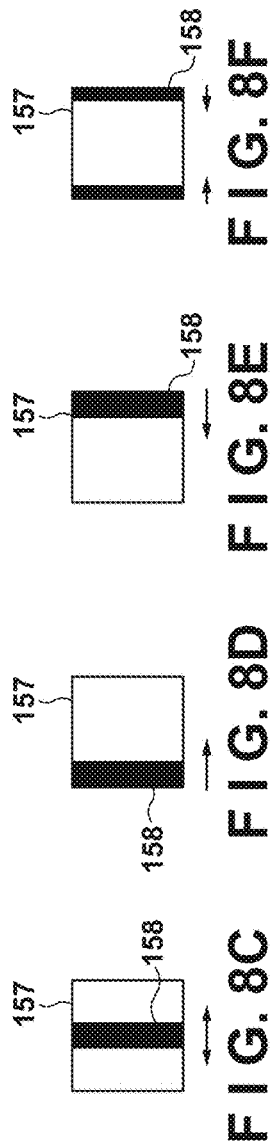

150 ▨ F0h
151 ▨ 80h
152 ▨ 60h

153

158  157

154 ▨ ON
155 ☐ OFF

F I G. 18A
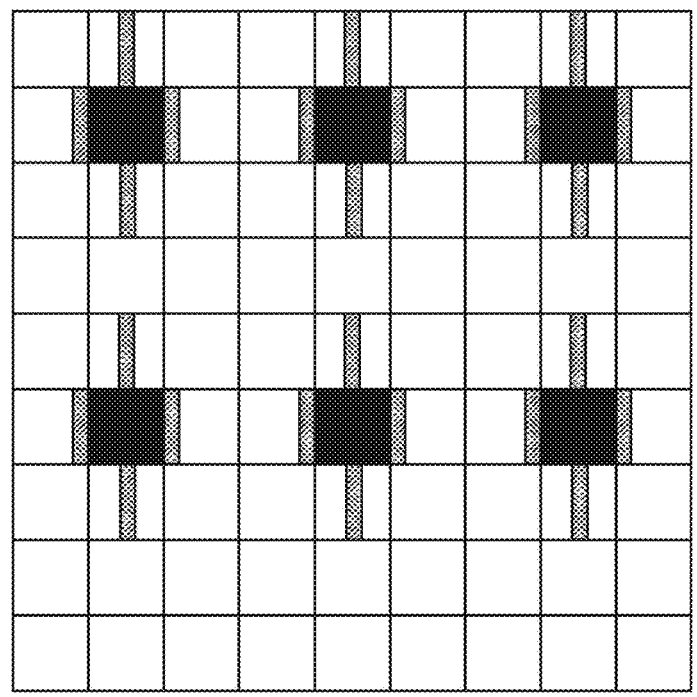
F I G. 18B
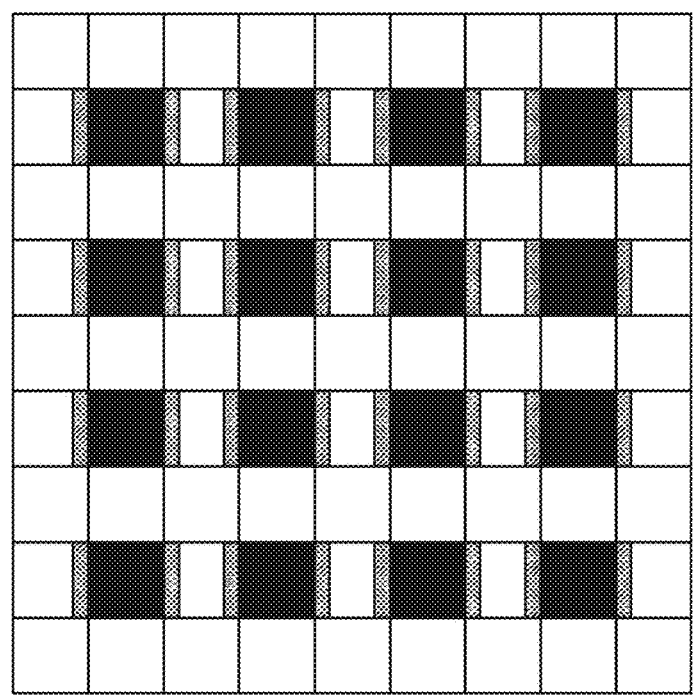

FIG. 21

| 6 | 4 | 7 |
|---|---|---|
| 2 | 1 | 3 |
| 8 | 5 | 9 |

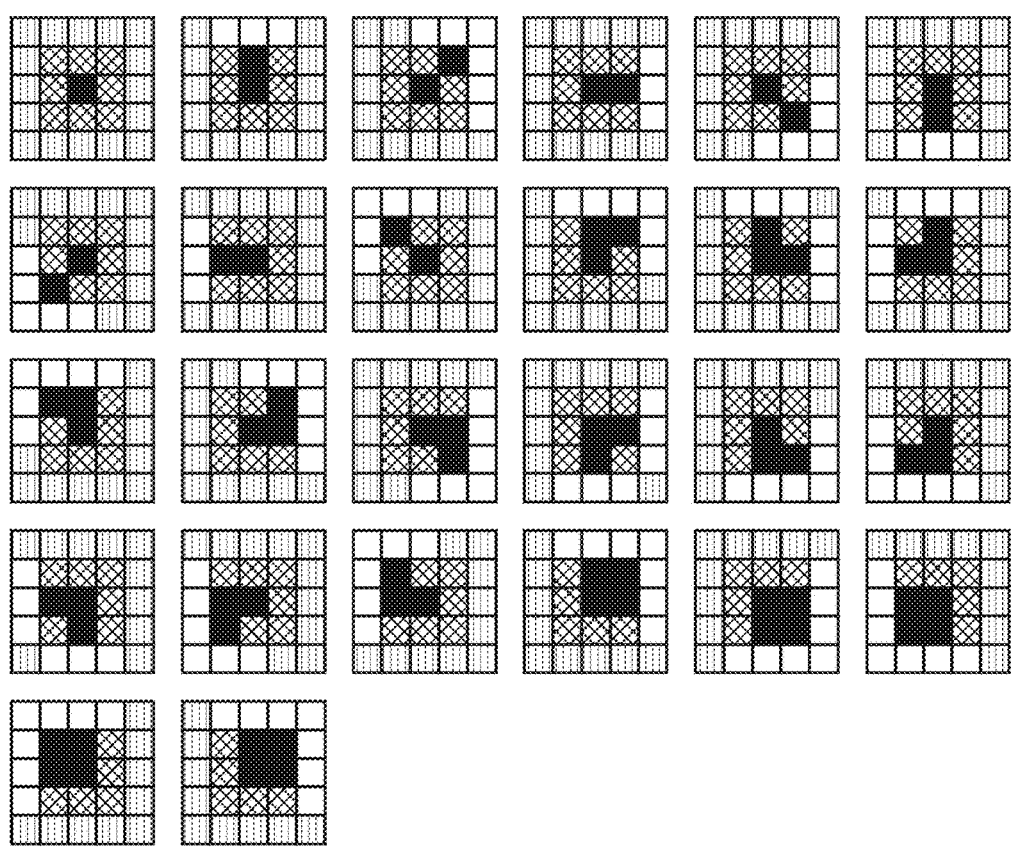
F I G. 24

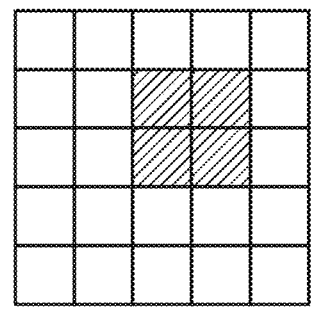
F I G. 25A
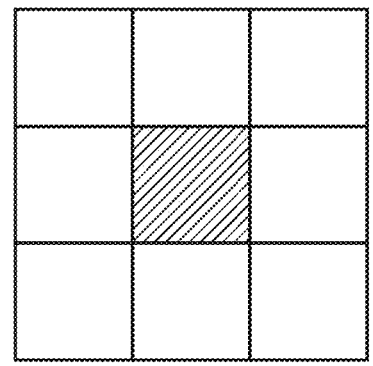
F I G. 25B
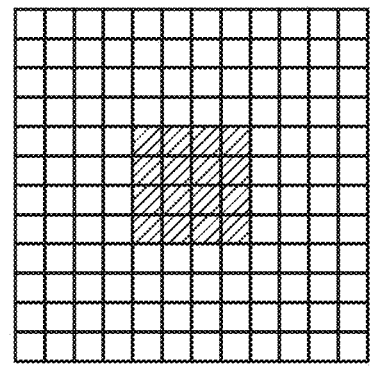
F I G. 25C

IMAGE FORMING APPARATUS THAT DIVIDES ONE PIXEL INTO PLURALITY OF PIXEL PIECES AND PERFORMS EXPOSURE ON PIXEL PIECE-BY-PIXEL PIECE BASIS

BACKGROUND OF THE INVENTION

Field of the Invention

The present invention relates to an image forming apparatus such as a laser beam printer, a digital copier and a digital FAX, and particularly relates to an image forming apparatus that performs image formation by using a light beam.

Description of the Related Art

An electrophotographic image forming apparatus includes an optical scanning device for exposing a photosensitive member. The optical scanning device causes a light beam to be reflected by a rotating polygon mirror to scan the surface of the photosensitive member, thus forming an electrostatic latent image on the photosensitive member. Here, the light beam reflected by the rotating polygon mirror generally scans the photosensitive member via a scanning lens having the fθ characteristic. The fθ characteristic means an optical characteristic by which a light beam is imaged on the surface of a photosensitive member such that a spot of a light beam moves on the surface of the photosensitive member at equal speeds when a rotating polygon mirror is rotating at equal angular velocities. With the use of a scanning lens having the fθ characteristic, it is possible to perform appropriate exposure by using an image clock having a constant cycle. However, a scanning lens having the fθ characteristic is relatively large, and is also expensive. Therefore, for the purpose of reducing the size and the cost of the image forming apparatus, it has been contemplated that the use of a scanning lens itself is omitted, or that a scanning lens that does not have the fθ characteristic is used.

Japanese Patent Laid-Open No. H02-131212 discloses a configuration in which electrical correction is performed such that the reproducibility of an image formed on the surface of a photosensitive member is constant even when a spot of a light beam does not move on the surface of the photosensitive member at equal speeds. Japanese Patent Laid-Open No. H02-131212 further discloses performing control such that light intensities are substantially equal on a scanning line.

An image forming apparatus is required to maintain the quality of a formed image at a quality higher than or equal to a predetermined quality. In this respect, increasing the reproducibility of isolated pixels is one condition for maintaining the image quality. This also applies to, for example, the case described in Japanese Patent Laid-Open No. H02-131212 where a scanning lens that does not have fθ characteristic is used.

SUMMARY OF THE INVENTION

According to an aspect of the present invention, an image forming apparatus includes: a photosensitive member; an exposure unit configured to divide one pixel into a plurality of pixel pieces and perform exposure on a pixel piece-by-pixel piece basis, to form an electrostatic latent image on the photosensitive member; a determination unit configured to determine, based on image data, an isolated pixel surrounded by blank pixels in the electrostatic latent image; a selection unit configured to select a correction target pixel from the blank pixels surrounding the isolated pixel; and a correction unit configured to correct the image data so as to expose a pixel piece of the correction target pixel.

Further features of the present invention will become apparent from the following description of exemplary embodiments with reference to the attached drawings.

BRIEF DESCRIPTION OF THE DRAWINGS

FIGS. 4A to 4C are diagrams showing LSF profiles according to an embodiment.

FIGS. 8A to 8F are explanatory diagrams of a screen according to an embodiment.

FIGS. 18A and 18B are image diagrams of correction of isolated pixels according to an embodiment.

FIG. 21 is a diagram showing selection ranks of correction target pixels according to an embodiment.

FIGS. 22A to 22C are diagrams showing images containing isolated pixels according to an embodiment.

FIGS. 23A to 23E are image diagrams of correction of isolated pixels according to an embodiment.

FIG. 24 is a diagram illustrating isolated pixels according to an embodiment.

FIGS. 25A to 25C are explanatory diagrams of a relationship between the region for determining isolated pixels and the resolution according to an embodiment.

DESCRIPTION OF THE EMBODIMENTS

Hereinafter, exemplary embodiments of the present invention will be described with reference to the accompanying drawings. It should be appreciated that the following embodiments are merely illustrative, and the present invention is not limited to the details of the embodiments. In the following drawings, constituent elements that are not necessary for the description of the embodiments have been omitted.

First Embodiment

Figure 1:
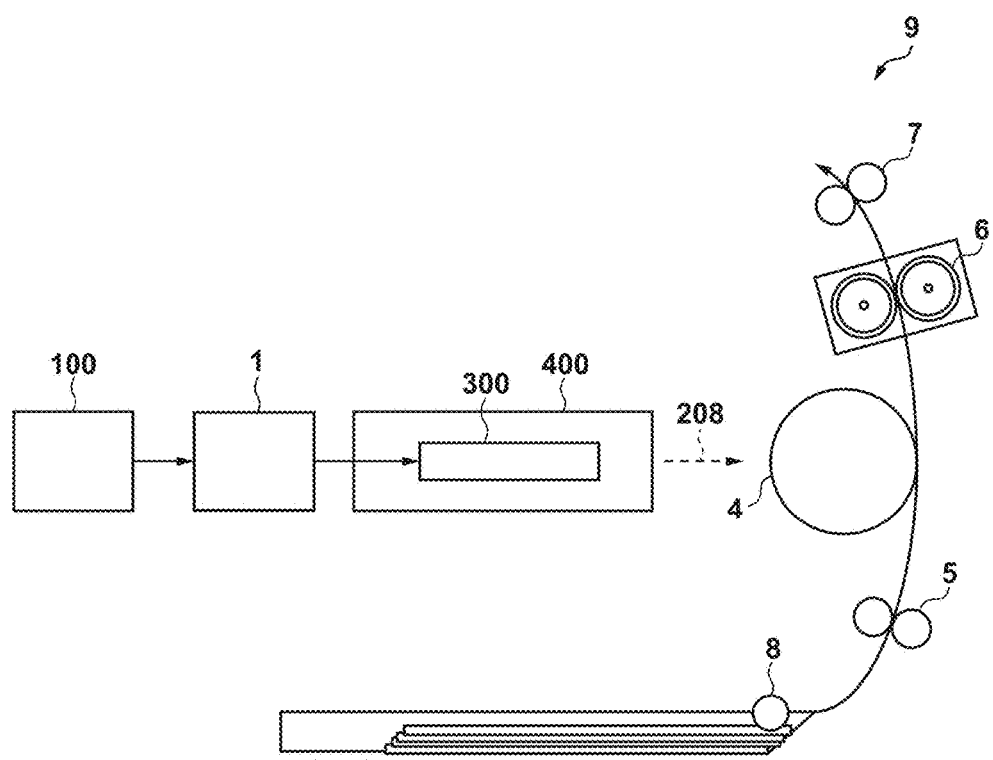
FIG. 1 is a configuration diagram of an image forming apparatus according to an embodiment.

FIG. 1 is a schematic configuration diagram of an image forming apparatus 9 according to the present embodiment. A laser driving unit 300 of an optical scanning device 400 emits a light beam 208 based on image data that is output from an image signal generation unit 100 and control data that is output from a controller 1. The light beam 208 scans a photosensitive member 4 that has been charged by a charging unit (not shown), to form a latent image on the surface of the photosensitive member 4. A developing unit (not shown) develops this latent image by using toner, to form a toner image. The toner image is transferred onto a recording medium such as paper that has been fed from a paper feed unit 8 and conveyed by a roller 5 to a position in contact with the photosensitive member 4. The toner image that has been transferred onto the recording medium is heat-fixed to the recording medium by a fixing unit 6. The recording medium to which the toner image has been fixed is discharged to the outside of the image forming apparatus 9 by a discharge roller 7.

Figure 2A:
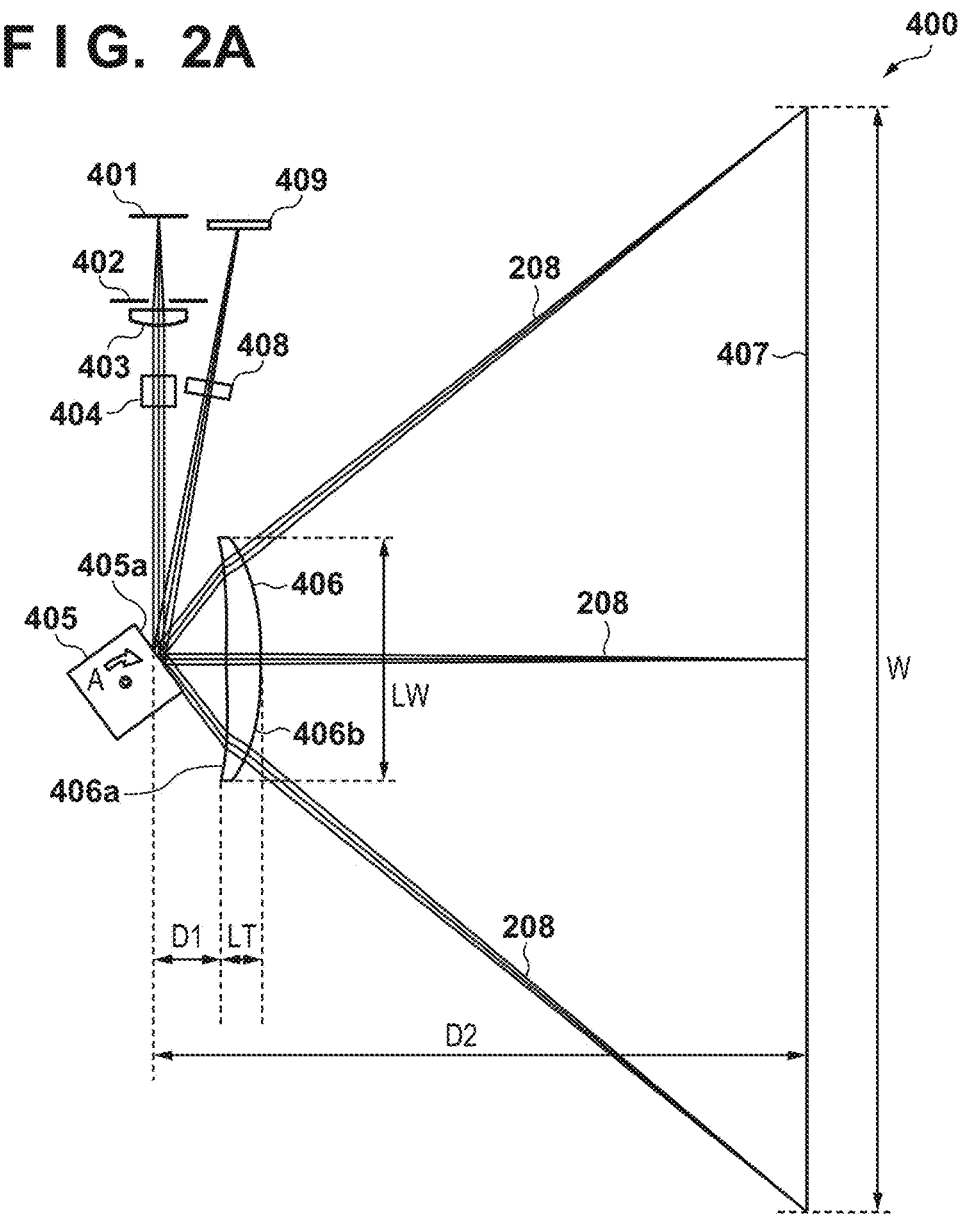
FIGS. 2A and 2B are configuration diagrams of an optical scanning device according to an embodiment.
Figure 2B:
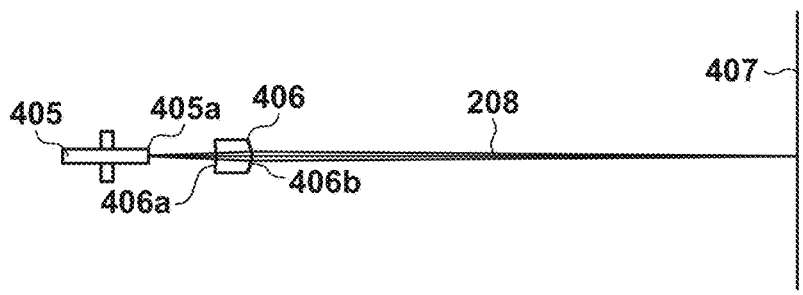

FIGS. 2A and 2B are configuration diagrams of the optical scanning device 400 according to the present embodiment. FIG. 2A shows a cross-sectional view in a main scanning direction, and FIG. 2B shows a cross-sectional view in a sub-scanning direction. The light beam (ray bundle) 208 that has been emitted from a light source 401 is shaped into an oval shape by an aperture stop 402, and is made incident on a coupling lens 403. The light beam 208 that has passed through the coupling lens 403 is converted into substantially parallel light, and is made incident on an anamorphic lens 404. Here, the substantially parallel light includes weak convergent light and weak divergent light. The anamorphic lens 404 has a positive refraction force in a main scanning cross section, and converts the ray bundle that is made incident thereon into convergent light in the main scanning cross section. In a sub-scanning cross section, the anamorphic lens 404 focuses the ray bundle in the vicinity of a reflective surface 405a of a deflector 405, and forms a line image that is long in the main scanning direction.

Then, the ray bundle that has passed through the anamorphic lens 404 are reflected by the reflective surface 405a of the deflector (polygon mirror) 405. The light beam 208 that has been reflected by the reflective surface 405a is transmitted through an imaging lens 406 and imaged on the surface of the photosensitive member 4, thus forming a predetermined spot-like image (hereinafter referred to as "spot"). By rotating the deflector 405 in the direction indicated by the arrow A at a constant angular velocity by a driving unit (not shown), the spot moves on a surface to be scanned 407 of the photosensitive member 4 in the main scanning direction, thus forming an electrostatic latent image on the surface to be scanned 407. Here, the main scanning direction is a direction that is parallel to the surface of the photosensitive member 4 and is orthogonal to the direction of movement of the surface of the photosensitive member 4. The sub-scanning direction is a direction that is orthogonal to the main scanning direction and the optical axis of the ray bundle.

A beam detect (hereinafter referred to as "BD") sensor 409 and a BD lens 408 constitute a synchronization optical systems that determine the timing at which the electrostatic latent image is written on the surface to be scanned 407. The light beam 208 that has passed through the BD lens 408 is made incident on and detected by the BD sensor 409 including a photodiode. Based on the timing at which the light beam 208 has been detected by the BD sensor 409, control of the writing timing is performed. Although the light source 401 of the present embodiment includes one light-emitting unit, it is also possible to use a light source 401 including a plurality of light-emitting units whose light emissions can be controlled independently.

As shown in FIGS. 2A and 2B, the imaging lens 406 has two optical surfaces (lens surfaces), namely, an incident surface 406a and an exit surface 406b. The imaging lens 406 is configured such that in the main scanning cross section, the ray bundle that has been deflected by the reflective surface 405a scans over the surface to be scanned 407 by the desired scanning characteristic. Additionally, the imaging lens 406 is configured to shape the spot of the laser light 208 on the surface to be scanned 407 into the desired shape. Note that the imaging lens 406 may be a plastic molded lens formed by injection molding. Alternatively, the imaging lens 406 may be a glass molded lens. A molded lens can be easily molded into an aspherical shape, and is suitable for mass production. Accordingly, the use of a molded lens as the imaging lens 406 makes it possible to enhance the productivity and the optical performance of the imaging lens 406.

The imaging lens 406 does not have the so-called fθ characteristic. That is, when the deflector 405 is rotating at equal angular velocities, the spot does not move on the surface to be scanned 407 at equal speeds. By using an imaging lens 406 that does not have the fθ characteristic, it is possible to place the imaging lens 406 in proximity to the deflector 405 (a position at a small distance D1). Furthermore, an imaging lens 406 that does not have the fθ characteristic can have a smaller length in the main scanning direction (width LW) and the optical axis direction (thickness LT) than an imaging lens having the fθ characteristic. Accordingly, a size reduction for the optical scanning device 400 can be achieved. In the case of a lens having the fθ characteristic, an abrupt change may occur in the shape of the incident surface and the exit surface of the lens when viewed in the main scanning cross section. If there are such shape constraints, a favorable imaging performance may not be achieved. In contrast, the imaging lens 406 does not have the fθ characteristic, and therefore undergoes few abrupt changes in the shapes of the incident surface and the exit surface of the lens when viewed in the main scanning cross section, thus making it possible to achieve a favorable imaging performance.

The scanning characteristic of the imaging lens 406 according to the present embodiment can be represented by the following expression (1).

$$Y = (K/B) \times \tan(B\theta) \tag{1}$$

In the expression (1), θ represents the scanning angle (scanning angle of view) of the deflector 405, Y represents the focusing position (image height) of the spot on the surface to be scanned 407, K represents the imaging coefficient at the axial image height, and B represents the coefficient (scanning characteristic coefficient) that determines the scanning characteristic of the imaging lens 406. In the present embodiment, the axial image height is the image height (Y=0) on the optical axis, and corresponds to the scanning angle θ=0. The off-axial image height corresponds to image heights other than the axial image height, or in other words, the scanning angle θ≠0. Furthermore, the most off-axial image height corresponds to the image height (Y=+Ymax, −Ymax) when the scanning angle θ is maximum (maximum scanning angle of view). A scanning width W, which is a width in the main scanning direction, of a predetermined region (scanning region) in which the latent image on the surface to be scanned 407 can be formed, can be represented by W=|+Ymax|+|−Ymax|. The center of the predetermined region corresponds to the axial image height and an end portion corresponds to the most off-axial image height.

Here, the imaging coefficient K is a coefficient corresponding to f in the scanning characteristic (fθ characteristic) Y=fθ when parallel light is made incident on the imaging lens 406. That is, the imaging coefficient K is a coefficient for bringing the focusing position Y and the scanning angle θ into a proportional relationship when a ray bundle other than parallel light is made incident on the imaging lens 406, as with the fθ characteristic. To provide a supplementary explanation for the scanning characteristic coefficient, the expression (1) where B=0 is Y=Kθ, and therefore, this corresponds to the scanning characteristic Y=fθ of an imaging lens used for the conventional optical scanning device. The expression (1) where B=1 is Y=K tan θ, and therefore, this corresponds to a projection characteristic Y=f tan θ of a lens used for an image capturing apparatus (camera) or the like. That is, by setting the scanning characteristic coefficient B in the range of 0≤B≤1 in the expression (1), it is possible to achieve a scanning characteristic between the projection characteristic Y=f tan θ and the fθ characteristic Y=fθ.

Here, differentiating the expression (1) by the scanning angle θ gives the scanning speed of the ray bundle on the surface to be scanned 407 for the scanning angle θ, as represented by the following expression (2):

$$dY/d\theta = K/(\cos^2(B\theta)) \quad (2)$$

Furthermore, dividing the expression (2) by the speed dY/dθ=K at the axial image height and subtracting 1 therefrom gives the following expression (3):

$$(1/(\cos^2(B\theta)))-1=\tan^2(B\theta) \quad (3)$$

The expression (3) represents the amount of deviation (partial magnification) in the scanning speed at each of the off-axial image heights relative to the scanning speed at the axial image height. The optical scanning device 400 according to the present embodiment has different scanning speeds of the ray bundles between the axial image height and the off-axial image heights except for the case where B=0.

Figure 3:
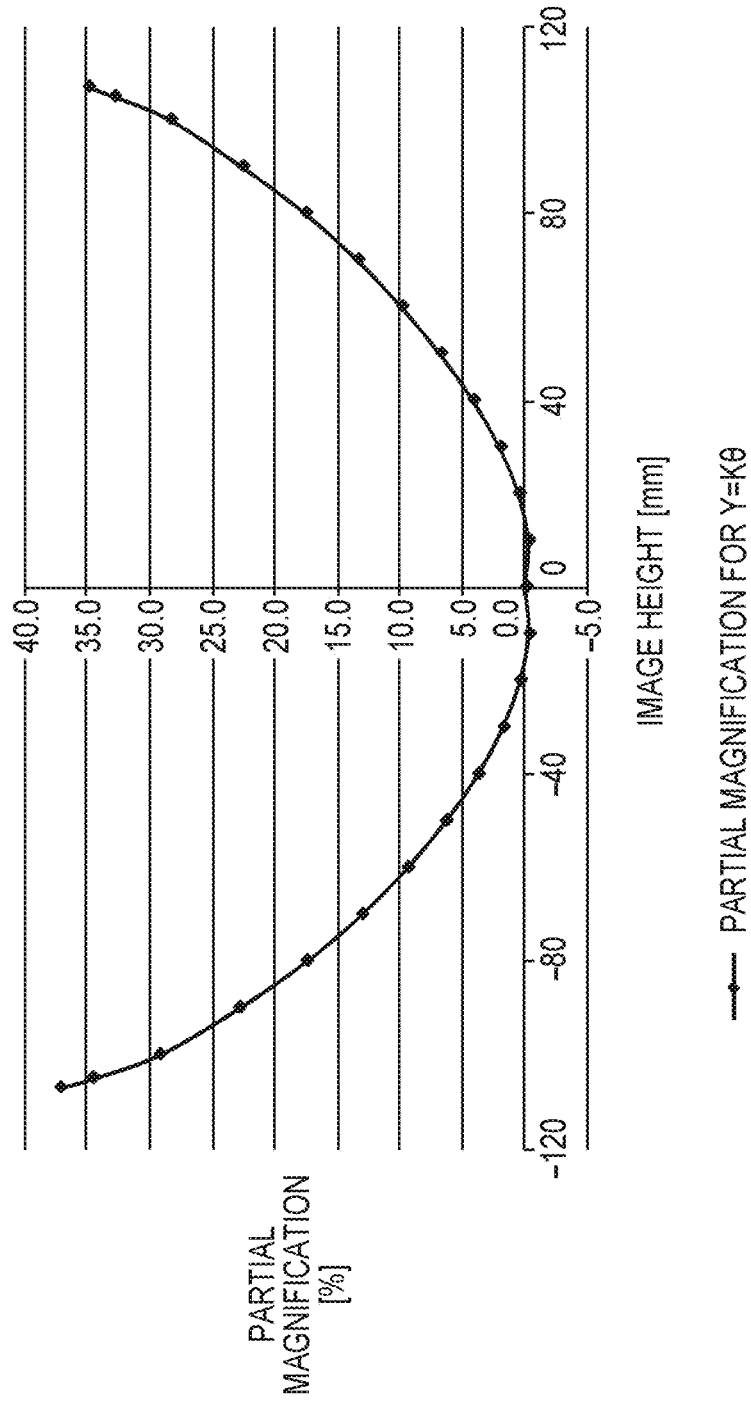
FIG. 3 is a diagram showing a relationship between the image height and the partial magnification according to an embodiment.

FIG. 3 shows a relationship between the image height and the partial magnification when the scanning positions on the surface to be scanned 407 are fitted with the characteristic Y=Kθ. In the present embodiment, as a result of providing the imaging lens 406 with the scanning characteristic represented by the expression (1), the scanning speed gradually increases and hence the partial magnification increases in a direction from the axial image height toward the off-axial image height, as shown in FIG. 3. A partial magnification of 30% means that when light is applied for the unit time, the irradiation length in the main scanning direction on the surface to be scanned 407 is increased by 1.3 times. Accordingly, when the pixel width in the main scanning direction is determined at a fixed time interval that has been determined in accordance with the cycle of an image clock, the pixel density differs between the axial image height and the off-axial image height.

The scanning speed gradually increases as the image height Y moves away from the axial image height and approaches the most off-axial image height (with an increase in the absolute value of the image height Y). Accordingly, the time required to scan the unit length when the image height is in the vicinity of the most off-axial image height becomes shorter than the time required to scan the unit length when the image height of the surface to be scanned 407 is the vicinity of the axial image height. This means that when the emission luminance of the light source 401 is constant, the total exposure amount per unit length when the image height is in the vicinity of the most off-axial image height is smaller than the total exposure amount per unit length when the image height is the vicinity of the axial image height.

That is, in the case of the optical configuration as described above, the variations in the partial magnification for the main scanning direction and the total exposure amount per unit length may not be suitable for maintaining a favorable image quality. Therefore, in the present embodiment, in order to achieve a favorable image quality, the correction of the above-described partial magnification and a luminance correction for correcting the total exposure amount per unit length are performed.

Figure 5:
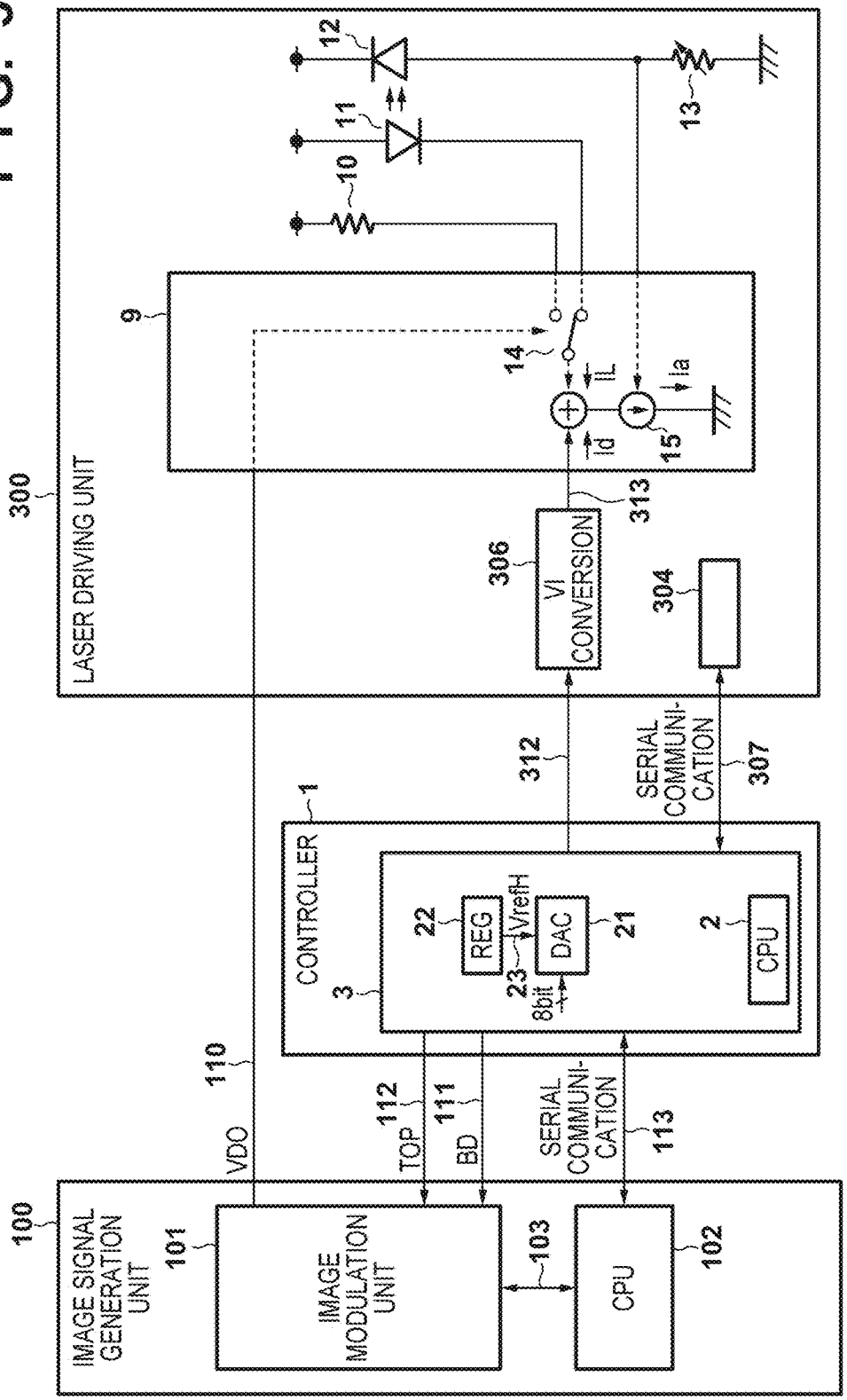
FIG. 5 is a diagram showing an exposure control configuration according to an embodiment.

FIG. 5 is a block diagram showing an exposure control configuration in the image forming apparatus 9. The image signal generation unit 100 receives image data from a host computer (not shown), and generates a VDO signal 110 corresponding to the image data. The image signal generation unit 100 also has the function of correcting the pixel width. The controller 1 performs the control of the image forming apparatus 9 and the luminance control for the light source 401. The laser driving unit 300 causes the light source 401 to emit light by supplying a current to a light-emitting unit 11 of the light source 401 based on the VDO signal 110.

When preparation for outputting image data has been completed, the image signal generation unit 100 instructs the controller 1 to start image formation via serial communication 113. When preparation for image formation has been completed, the controller 1 transmits, to the image signal generation unit 100, a TOP signal 112 serving as a sub-scanning synchronization signal, and a BD signal 111 serving as a main scanning synchronization signal. Upon receiving the synchronization signals, the image signal generation unit 100 outputs, to the laser driving unit 300, the VDO signal 110 serving as an image signal at a predetermined timing. Note that the main constituting blocks of each of the image signal generation unit 100, the controller 1, and the laser driving unit 300 will be described later.

Figure 6A:
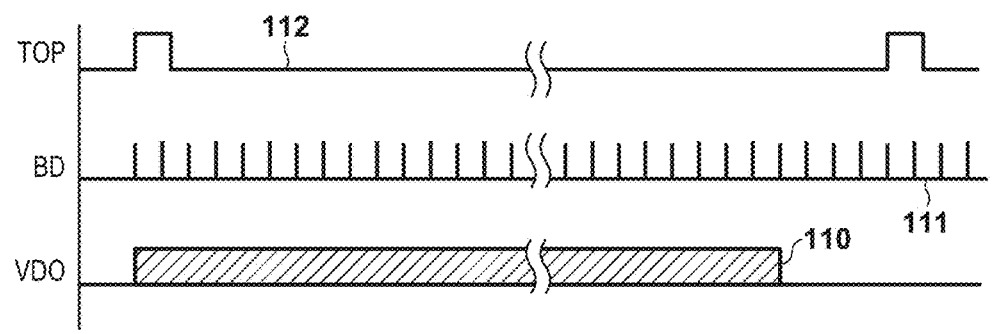
FIG. 6A is a time chart of a synchronization signal and an image signal according to an embodiment.

FIG. 6A is a timing chart of various synchronization signals and an image signal when an image forming operation corresponding to one page of a recording medium is performed. In the drawing, the time elapses from left to right. "HIGH" of the TOP signal 112 indicates that the leading edge of the recording medium has reached a predetermined position. Upon receiving "HIGH" of the TOP signal 112, the image signal generation unit 100 transmits the VDO signal 110 in synchronization with the BD signal 111. Based on the VDO signal 110, the light source 401 emits light and forms a latent image on the photosensitive member 4. In order to simplify the illustration, FIG. 6A is described such that the VDO signal 110 is successively output so as to span over a plurality of BD signals 111. However, actually, the VDO signal 110 is output in a predetermined period between the output of a BD signal 111 and the output of the next BD signal 111.

Figure 6B:
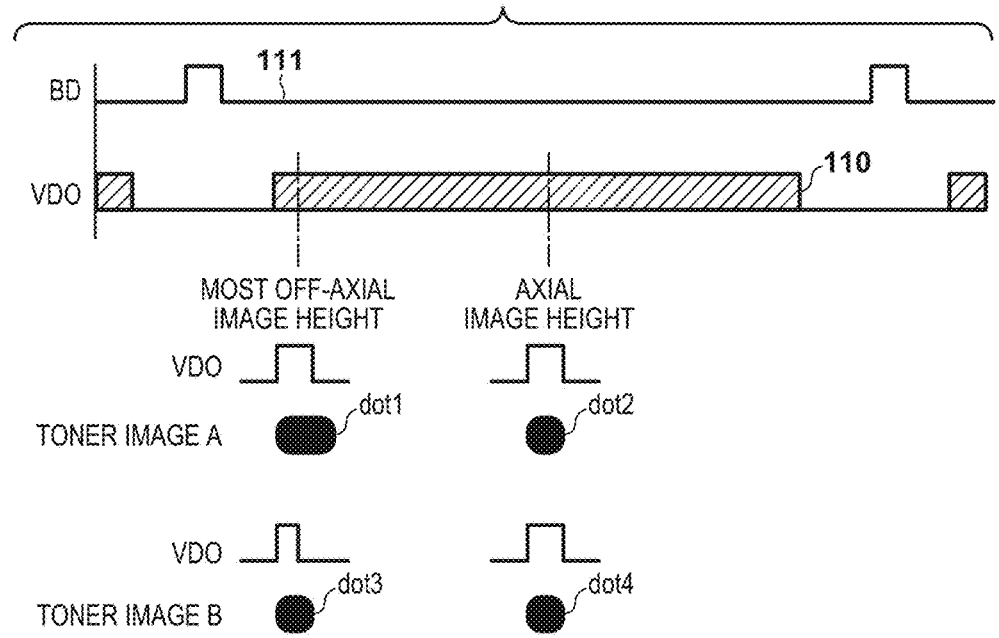
FIG. 6B is a diagram showing dot images at an axial image height and a most off-axial image height according to an embodiment.

The method for correcting the partial magnification performed by the image signal generation unit 100 will be described. Prior to the description, the cause and the correction principle of the partial magnification will be described with reference to FIG. 6B. FIG. 6B is a diagram showing the timings of the BD signal 111 and the VDO signal 110, and dot images of a latent image on the surface to be scanned 407. In the drawing, the time elapses from left to right. Upon receiving a rising edge of the BD signal 111, the image signal generation unit 100 transmits the VDO signal 110 after a predetermined timing such that a latent image can be formed at a position away from the left end of the photosensitive member 4 by the desired distance. Then, based on the VDO signal 110, the light source 401 emits light and forms a latent image corresponding to the VDO signal 110 on the surface to be scanned 407.

Here, a case will be described where the light source 401 is caused to emit light to form a dot-like latent image for the same time period at the axial image height and the most off-axial image height based on the VDO signal 110. The size of the dot corresponds to one 600 dpi dot (having a width of 42.3 um in the main scanning direction). As described above, the optical scanning device 400 has an optical configuration in which the scanning speed at the end portion (most off-axial image height) is faster than that at the center portion (axial image height) on the surface 407 to be scanned. As shown as toner images A, a latent image dot1 at the most off-axial image height is enlarged in the main scanning direction, as compared with a latent image dot2 at the axial image height. Accordingly, in the present embodiment, as partial magnification correction, the cycle and the time width of the VDO signal 110 are corrected according to the position in the main scanning direction. That is, by partial magnification correction, the light-emission time interval at the most off-axial image height is shortened as compared with the light-emission time interval at the axial image height such that a latent image dot3 at the most off-axial image height and a latent image dot4 at the axial image height have equivalent sizes as shown as toner images B. Such a correction allows dot-like latent images corresponding to the respective pixels to be formed at substantially equal intervals for the main scanning direction.

Figure 7:
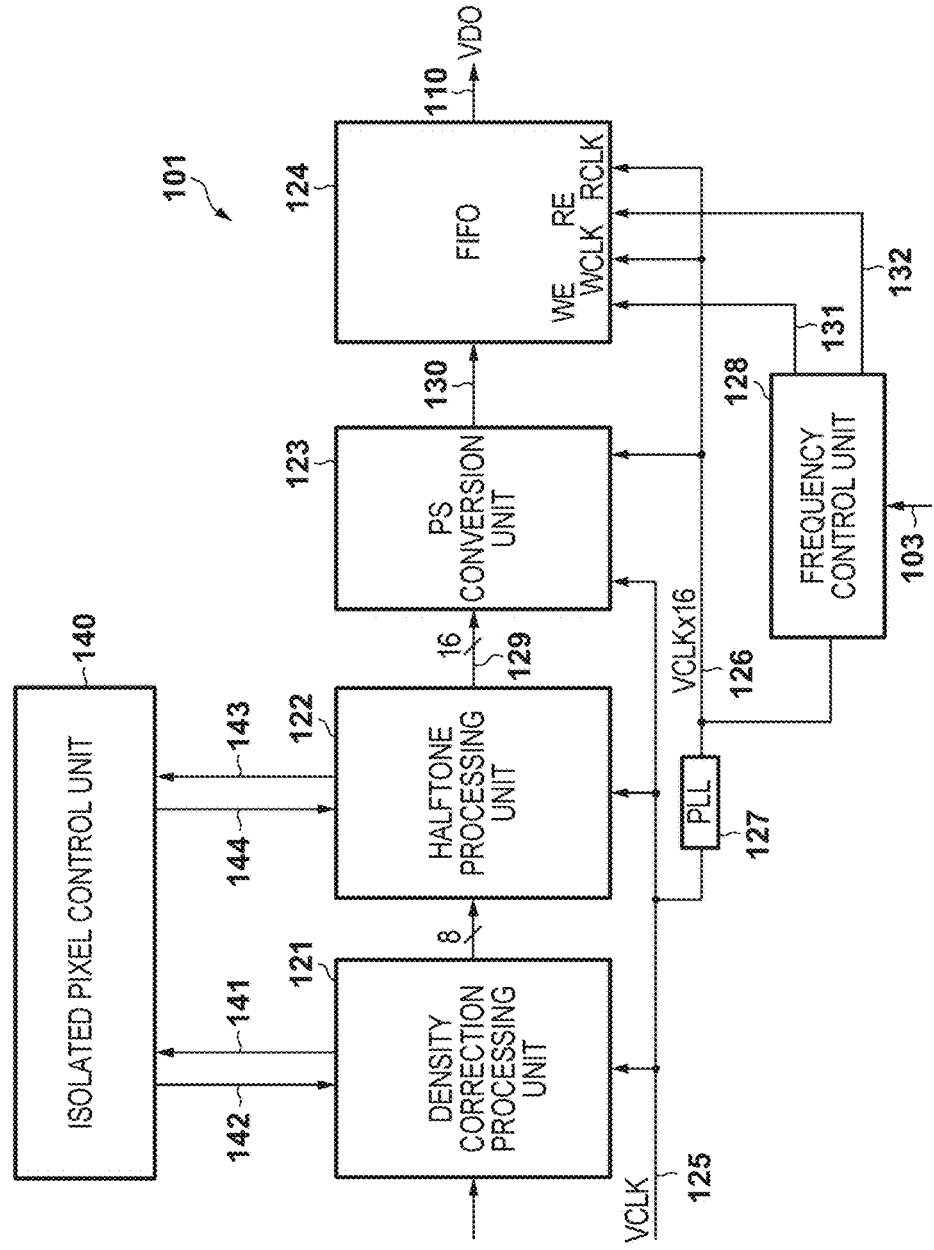
FIG. 7 is a block diagram of an image modulation unit according to an embodiment.

FIG. 7 is a block diagram showing an example of an image modulation unit 101 of the image signal generation unit 100. A density correction processing unit 121 stores a density correction table for density correction, and corrects the density of the input image data based on the density correction table. A halftone processing unit 122 performs conversion processing for screening (dithering) image data and representing the density thereof in the image forming apparatus 9. An isolated pixel control unit 140 performs correction processing on isolated pixels. Isolated pixel correction processing, the details of which will be described later, performed by the isolated pixel control unit 140 may be performed on image data 141 before the image data has been subjected to the halftone processing performed by the halftone processing unit 122, or may be performed on image data 143 that has been subjected to halftone processing. When isolated pixel correction processing is performed before halftone processing, the density correction processing unit 121 outputs the density-corrected image data 141 to the isolated pixel control unit 140. The isolated pixel control unit 140 outputs the processed image data 142 either via the density correction processing unit 121 or directly to the halftone processing unit 122. On the other hand, when isolated pixel correction processing is performed after halftone processing, the density correction processing unit 121 outputs the density-corrected image data 141 to the halftone processing unit 122. Then, the halftone processing unit 122 outputs the image data 143 that has been subjected to halftone processing to the isolated pixel control unit 140. The isolated pixel control unit 140 outputs the processed image data 143 either via the halftone processing unit 122 or directly to a PS conversion unit 123. In the following description, the PS conversion unit 123 always receives data from the halftone processing unit 122, and a signal of the data is referred to as a signal 129.

FIG. 8A is an example of a screen used by the halftone processing unit 122, and the density is represented by a matrix 153 of 200 lines including three pixels in each of the main scanning direction and the sub-scanning direction. The white portion in the drawing is a (off) portion where the light source 401 is not caused to emit light, and the black portion is a (on) portion where the light source 401 is caused to emit light. A matrix 153 is provided for each tone, and the level of tone increases (as the density increase) in the order indicated by the arrows. In the present embodiment, one pixel 157 serves as a unit of delimiting image data for forming one 600 dpi dot on the surface to be scanned 407. As shown in FIG. 8B, in a state before correcting the pixel width, one pixel is divided into 16 pixel pieces, and the on/off of the light emission of the light source 401 is switched on a pixel piece-by-pixel piece basis. That is, one pixel can represent 16 steps of tone. In addition, the order of turning on a plurality of pixel pieces of one pixel according to the density can be freely controlled. FIGS. 8C to 8F are diagrams illustrating the order of turning on the pixel pieces. FIG. 8C shows a type in which pixel pieces grow in a direction from the center to opposite ends, FIG. 8D shows a type in which pixel pieces grow in a direction from left to right, FIG. 8E shows a type in which pixel pieces grow in a direction from right to left, and FIG. 8F shows a type in which pixel pieces grow in a direction from opposite ends to the center. Note that FIG. 8A shows an example of screen growth for which FIGS. 8C to 8E are used.

Referring back to FIG. 7, the PS conversion unit 123 converts an input parallel 16-bit signal 129 into a serial signal 130. A FIFO 124 receives the serial signal 130, accumulates the serial signal 130 in a line buffer (not shown), and, after a predetermined time, outputs the serial signal 130 to a laser driving unit 300 in the subsequent stage as a VDO signal 110 also in the forms of a serial signal. The write and read control for the FIFO 124 is performed by a frequency control unit 128 controlling a write enable signal WE131 and a read enable signal RE132. Note that the frequency control unit 128 performs this control based on partial magnification information that is received from a CPU 102 via a CPU bus 103. A PLL unit 127 supplies a clock (VCLKx16) 126, which is obtained by multiplying the frequency of a clock (VCLK) 125 corresponding to one pixel by 16 times, to the PS conversion unit 123 and the FIFO 124.

Figure 9:
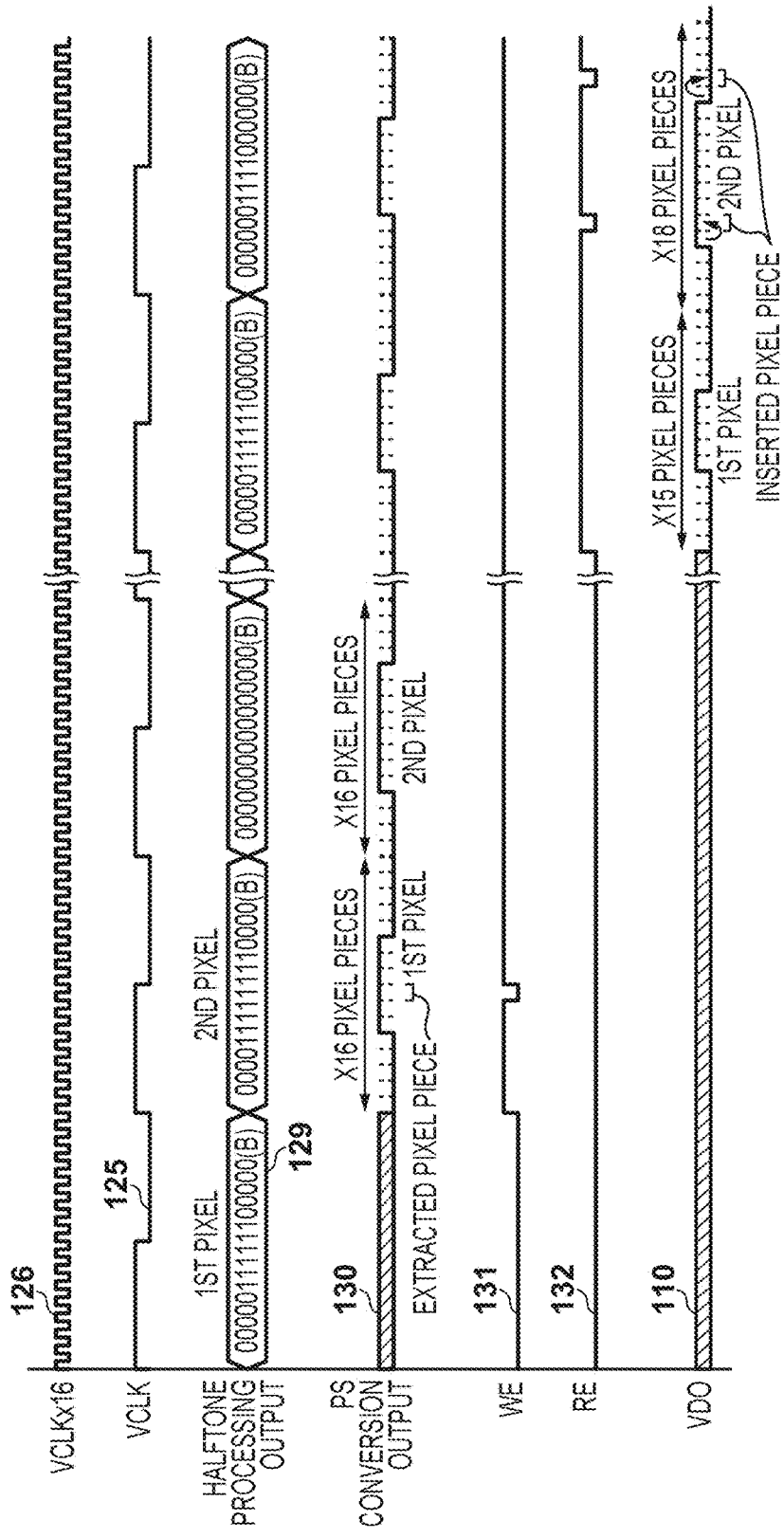
FIG. 9 is a time chart relating to an operation of the image modulation unit according to an embodiment.

Next, the operations on and after the halftone processing in the block diagram shown in FIG. 7 will be described with reference to the time chart, which is shown in FIG. 9, relating to the operation of the image modulation unit 101.

As previously described, the PS conversion unit 123 obtains, from the halftone processing unit 122, the multi-valued 16-bit signal 129 in synchronization with the clock 125, and sends the serial signal 130 to the FIFO 124 in synchronization with the clock 126. The FIFO 124 obtains the signal 130 only if the WE signal 131 is valid "HIGH". In the case of shortening an image in the main scanning direction in order to correct partial magnification, the frequency control unit 128 controls the FIFO 124 not to obtain the serial signal 130 by partially making the WE signal invalid "LOW". That is, pixel pieces are extracted. FIG. 9 shows an example in which one pixel is composed of 15 pixel pieces by extracting one pixel piece from the 1st pixel in the drawing in a configuration in which one pixel is normally composed of 16 pixel pieces.

The FIFO 124 reads out the data accumulated only if the RE signal 132 is valid "HIGH", in synchronization with the clock 126 (VCLKx16), and outputs the VDO signal 110. In the case of elongating an image in the main scanning direction in order to correct partial magnification, the frequency control unit 128 partially makes the RE signal 132 invalid "LOW". Thereby, the clock 126 continues to output the data one clock before, without the FIFO 124 updating the read data. That is, a pixel piece containing the same data as the data contained in the immediately previously processed pixel piece located adjacent on the upstream side for the main scanning direction is inserted. FIG. 9 shows an example in which one pixel is composed of 18 pixel pieces by inserting two pixel pieces into the 2nd pixel in the drawing in a configuration in which one pixel is normally composed of 16 pixel pieces. Note that the FIFO 124 is described as a circuit configured to continue the previous output when the RE signal is invalid "LOW", instead of being configured such that the output is brought into the Hi-Z state.

Figure 10A:
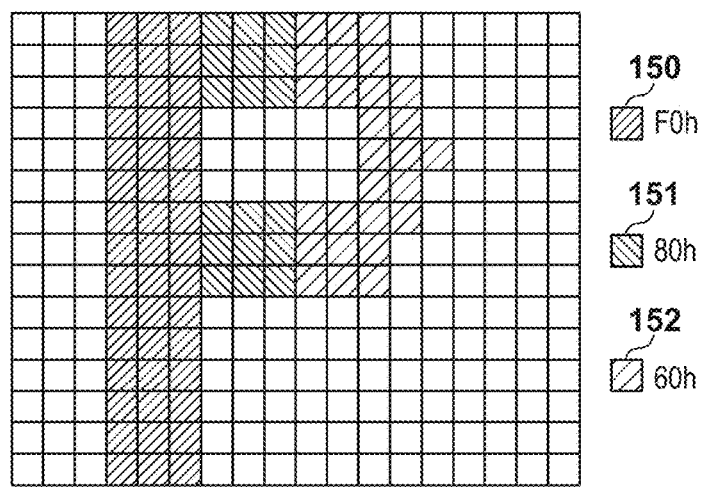
FIGS. 10A to 10C are explanatory diagrams of halftone processing according to an embodiment.
Figure 10B:
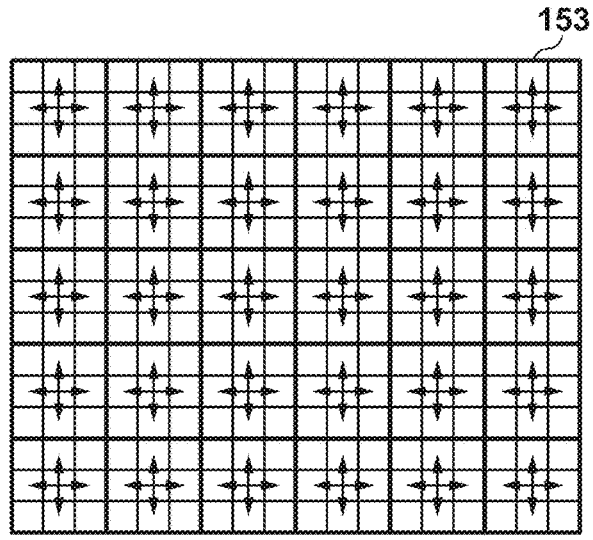
Figure 10C:
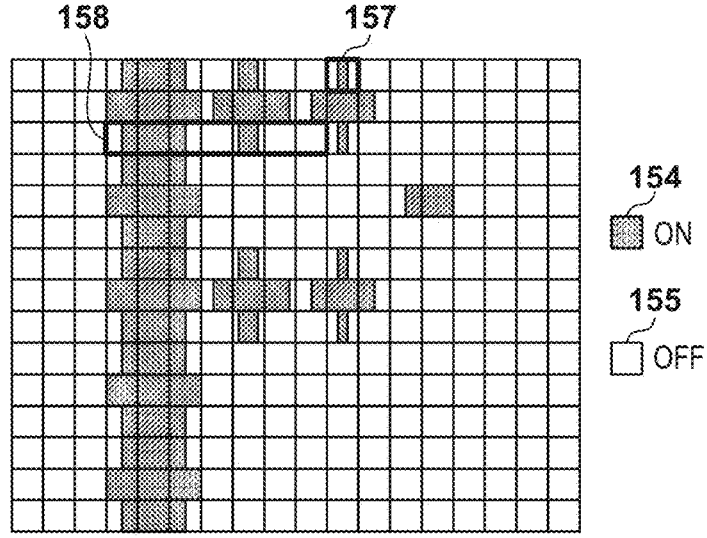

FIGS. 10A to 10C and FIGS. 11A and 11B are diagrams of illustration using images, from the parallel 16-bit signal 129, which is an input image of the halftone processing unit 122, to the VDO signal 110, which is an output from the FIFO 124. FIG. 10A shows an example of a multi-valued parallel 8-bit image signal that is input into the halftone processing unit 122. Each pixel has 8-bit density information. A pixel 150 has density information of F0$h$, a pixel 151 has density information of 80$h$, a pixel 152 has density information of 60$h$, and a white background portion has density information of 00$h$. FIG. 10B shows a screen that includes 200 lines and grows from the center, as described with reference to FIGS. 8A to 8F. FIG. 10C shows an image of the parallel 16-bit signal 129 that has been subjected to halftone processing, and each of the pixels 157 is composed of 16 pixel pieces as described above.

Figure 11A:
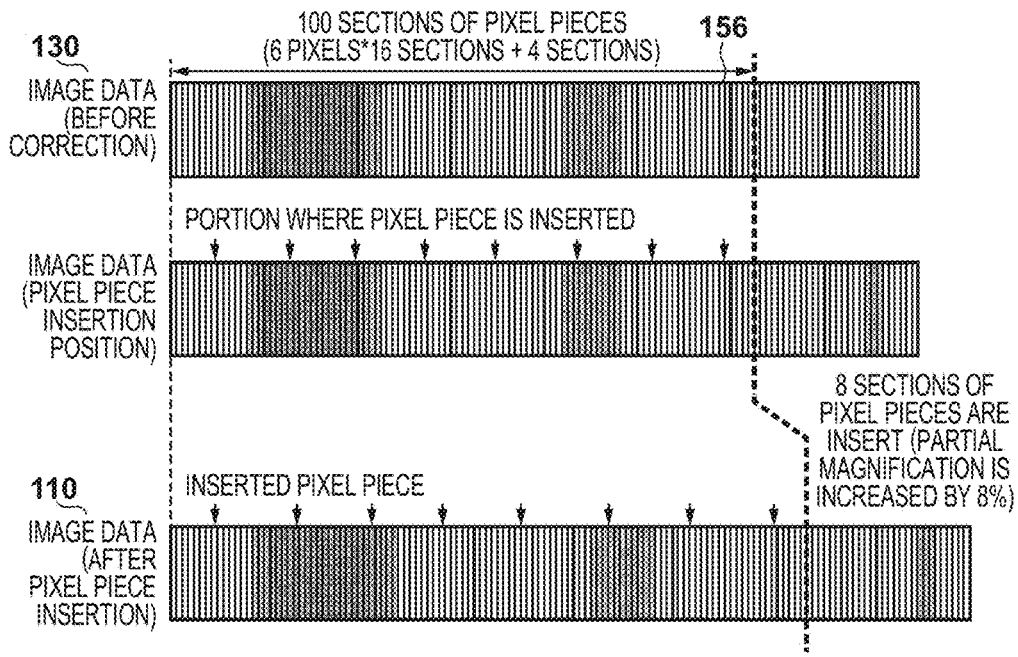
FIGS. 11A and 11B are explanatory diagrams of insertion/extraction of pixel pieces according to an embodiment.
Figure 11B:
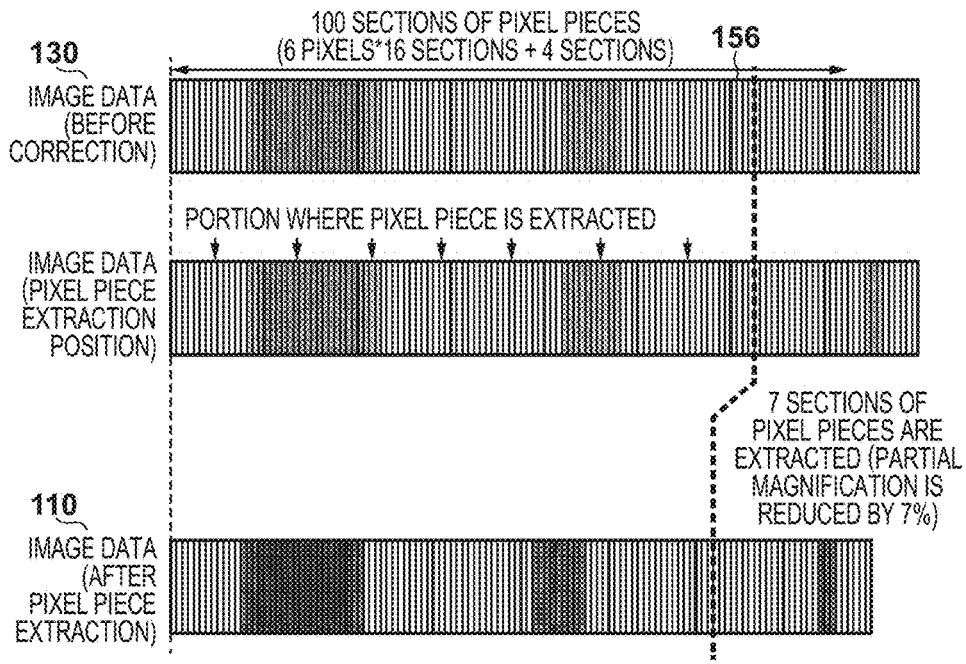

FIGS. 11A and 11B show, focusing on an area 158 including eight pixels arranged in the main scanning direction shown in FIG. 10C for the serial signal 130, an example in which the image is elongated by inserting pixel pieces and an example in which the image is shortened by extracting pixel pieces. FIG. 11A shows an example in which partial magnification is increased by 8%. By inserting, into a group of 100 consecutive pixel pieces, a total of 8 pixel pieces at uniform or substantially uniform intervals, it is possible to change the pixel width so as to increase the partial magnification by 8%, thus elongating the latent image in the main scanning direction. FIG. 11B shows an example in which the partial magnification is decreased by 7%. By extracting, from a group of 100 consecutive pixel pieces, a total of 7 pixel pieces at uniform or substantially uniform intervals, it is possible to change the pixel width by decreasing the partial magnification by 7%, thus shortening the latent image in the main scanning direction. Thus, the partial magnification correction enables dot-shaped latent images corresponding to the respective pixels of image data to be formed at substantially equal intervals for the main scanning direction by changing the width of a pixel having a length in the main scanning direction less than the width of one pixel. Note that "substantially equal intervals for the main scanning direction" includes a case where pixels are not completely equidistantly disposed. That is, as a result of performing partial magnification correction, there may be some variations in the pixel intervals, as long as the pixel intervals are, on the average, equal within a predetermined image height range. As described above, in the case of inserting or extracting pixel pieces at uniform or substantially uniform intervals, when the numbers of pixel pieces constituting a pixel is compared between two adjacent pixels, the difference between the numbers of the pixel pieces constituting the pixels is 0 or 1. Accordingly, the variations in the image density in the main scanning direction as compared with the original image data can be suppressed, thus making it possible to achieve a favorable image quality. The position at which pixel pieces are inserted or extracted may be the same for each scanning line for the main scanning direction, or may be shifted from each other.

As described above, the scanning speed increases with an increase in the absolute value of the image height Y. Accordingly, in the partial magnification correction, the above-described insertion and/or extraction of pixel pieces is performed such that the image becomes shorter (the length of one pixel decreases) with an increase in the absolute value of the image height Y. In this manner, latent images corresponding to the respective pixels can be formed at substantially equal intervals for the main scanning direction, thus appropriately correcting the partial magnification.

Here, a description has been given of the method for correcting the partial magnification in the main scanning direction by inserting/extracting different pixel pieces for each scanning position by the frequency control unit 128 shown in FIG. 7. It is also possible to use a method in which the frequency control unit 128 corrects partial magnification by separately using PLL or the like to control the frequency for each scanning position, without using the pixel piece insertion/extraction control. In the present embodiment, the imaging lens 406 does not have an fθ characteristic. However, it is also possible to adopt a configuration in which the imaging lens 406 or another lens (not shown) may be provided with an insufficient fθ characteristic, and partial magnification correction is electrically performed to compensate for the fθ characteristic.

Next, luminance correction will be described. The reason why the luminance correction is performed is as follows. Because correction is performed by partial magnification correction such that the length of one pixel decreases with an increase in the absolute value of the image height Y, the total exposure amount (integrated light amount) to one pixel by the light source 401 is reduced with an increase in the absolute value of the image height Y. In the luminance correction, correction is performed such that the total exposure amount (integrated light amount) to one pixel is made constant among image heights by correcting the luminance of the light source 401.

The controller 1 shown in FIG. 5 includes an IC 3 incorporating a CPU core 2, an 8-bit DA converter 21, and a regulator 22, and constitutes a luminance correction unit, together with the laser driving unit 300. The laser driving unit 300 includes a memory 304, a VI conversion circuit 306 that converts a voltage into a current, and a laser driver IC 9, and supplies a drive current to the light-emitting unit 11 of the light source 401. In the memory 304, partial magnification information is saved, and information on the correction current supplied to the light-emitting unit 11 is saved. The partial magnification information is partial magnification information corresponding to a plurality of image heights for the main scanning direction. Note that the partial magnification information may be replaced with characteristic information on the scanning speed on the surface to be scanned.

Next, the operation of the laser driving unit 300 will be described. Based on the information on the correction current for the light-emitting unit 11 that is stored in the memory 304, the IC 3 adjusts a voltage 23 that is output from the regulator 22, and outputs the adjusted voltage 23. The voltage 23 serves as a reference voltage for the DA converter 21. Next, the IC 3 sets input data for the DA converter 21, and outputs an analog voltage 312 for luminance correction, in synchronization with the BD signal 111. The VI conversion circuit 306 in the subsequent stage converts the luminance correction analog voltage 312 into a current 313, and outputs the current 313 to the laser driver IC 9. Although the IC 3 outputs the luminance correction analog voltage 312 in the present embodiment, a DA converter may be mounted on the laser driving unit 300, and the luminance correction analog voltage 312 may be generated in the vicinity of the laser driver IC 9.

The laser driver IC 9 controls ON/OFF of the light emission of the light source 401 by switching the supply destination of the current IL between the light-emitting unit 11 and a dummy resistor 10 in accordance with the VDO signal 110. The current IL that is supplied to the light-emitting unit 11 is a current resulting from subtracting the current 313 from a current Ia that has been set in a constant current circuit 15. The current Ia that is supplied to the constant current circuit 15 is automatically adjusted by feedback control such that the luminance detected by a photodetector 12 is a desired luminance Papc1. This automatic adjustment is the so-called APC (Automatic Power Control). The value of a variable resistor 13 has been adjusted during factory assembly such that the desired voltage is input into the laser driver IC 9 when the light-emitting unit 11 is emitting light at a predetermined luminance.

Figure 12:
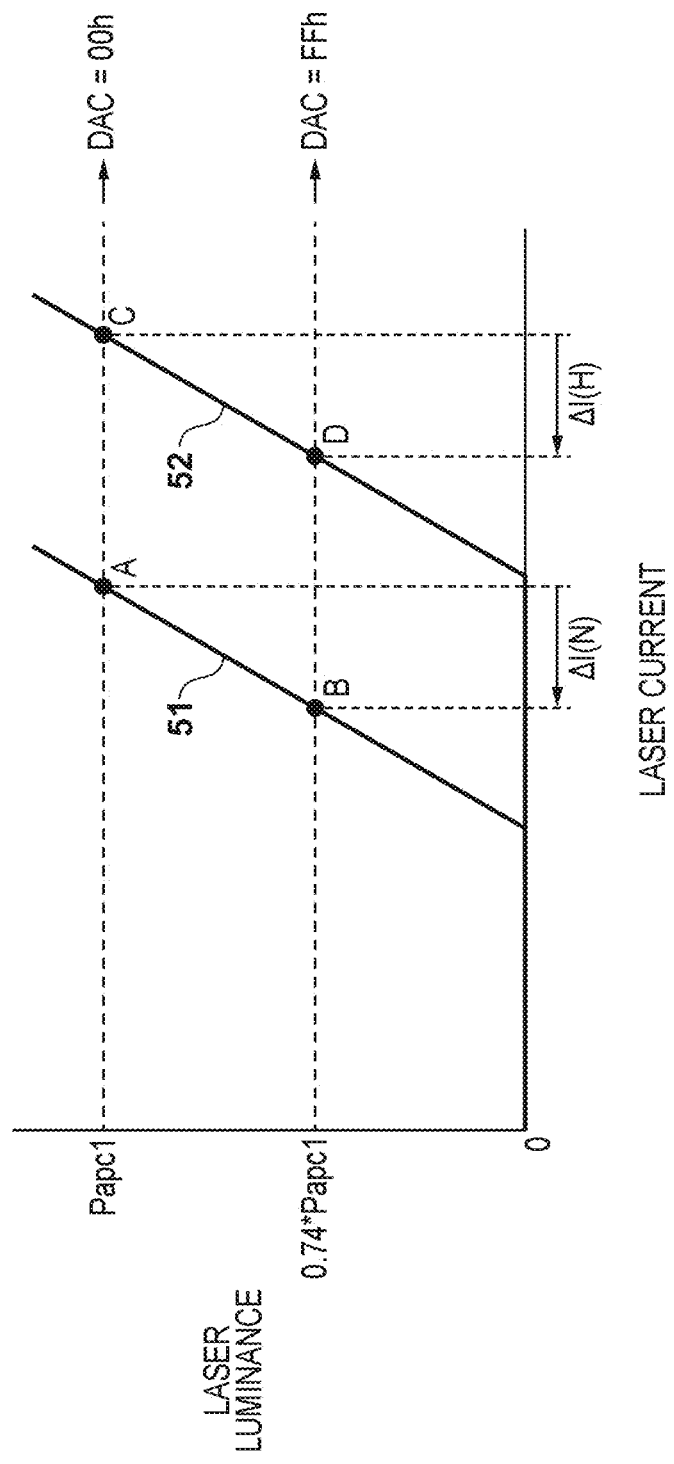
FIG. 12 is a diagram showing a relationship between the current and the luminance of a light-emitting unit according to an embodiment.

FIG. 12 is a graph showing the characteristics of the current and the luminance of the light-emitting unit 11. The current Ia required to cause the light-emitting unit 11 to emit light at a predetermined luminance changes depending on the ambient temperature. In FIG. 12, a graph 51 shows a relationship between the current and the luminance at a standard temperature, and a graph 52 shows a relationship between the current and the luminance under a high-temperature environment. It is known that in general, the current Ia required for a laser diode used as the light-emitting unit 11 to output a predetermined luminance changes depending on the ambient temperature, but the efficiency (gradient in the drawing) of the laser diode hardly changes. That is, in order to cause light emission at a predetermined luminance Papc1, the current value indicated by the point A is required as the current Ia under a standard temperature environment, whereas the current value indicated by the point C is required as the current Ia under a high-temperature environment. As described previously, by monitoring the luminance using the photodetector 12, the laser driver IC 9 automatically adjusts the current Ia supplied to the light-emitting unit 11 so as to provide the predetermined luminance Papc1 even when the ambient temperature has changed. Since the efficiency of the light-emitting unit 11 is substantially unchanged even when the ambient temperature has changed, the luminance thereof can be reduced to a luminance that is a predetermined number times Papc1 by subtracting a predetermined current ΔI(N) or ΔI(H) from the current Ia for causing light emission at the predetermined luminance Papc1. Note that the luminance is changed to be 0.74 times the predetermined luminance Papc1 in FIG. 12. In addition, ΔI(N) and ΔI(H) each take substantially the same value, regardless of the ambient temperature. In the present embodiment, the luminance of the light-emitting unit 11 is gradually raised as the image height moves from the axial image height to the most off-axial image height, so that the light-emitting unit 11 emits light at the luminance indicated by the point B or the point D as shown in FIG. 12 at the center portion, and emits light at the luminance indicated by the point A or the point C at the end portion.

The luminance correction is performed by subtracting the current Id corresponding to the predetermined current ΔI(N) or ΔI(H) from the current Ia that has been automatically adjusted so as to cause light emission at the desired luminance. As described above, the scanning speed increases with an increase in the absolute value of the image height Y. Then, the total exposure amount (integrated light amount) to one pixel decreases with an increase in the absolute value of the image height Y. Accordingly, in the luminance correction, the luminance is corrected so as to increase with an increase in the absolute value of the image height Y. Specifically, the current IL is increased with an increase in the absolute value of the image height Y by setting the current 313 so as to decrease with an increase in the absolute value of the image height Y. In this manner, it is possible to appropriately correct the luminance. Although the foregoing has described the method for correcting the total exposure amount to one pixel such that the total exposures at the various image heights match each other, it is possible, for example, to correct the exposure amount of a line image or a patch image such that the exposure amounts at the respective image heights match each other. Although a description is given in the present embodiment assuming that the luminance correction is performed, it is possible to adopt a configuration in which the luminance correction is not performed.

Figure 13:
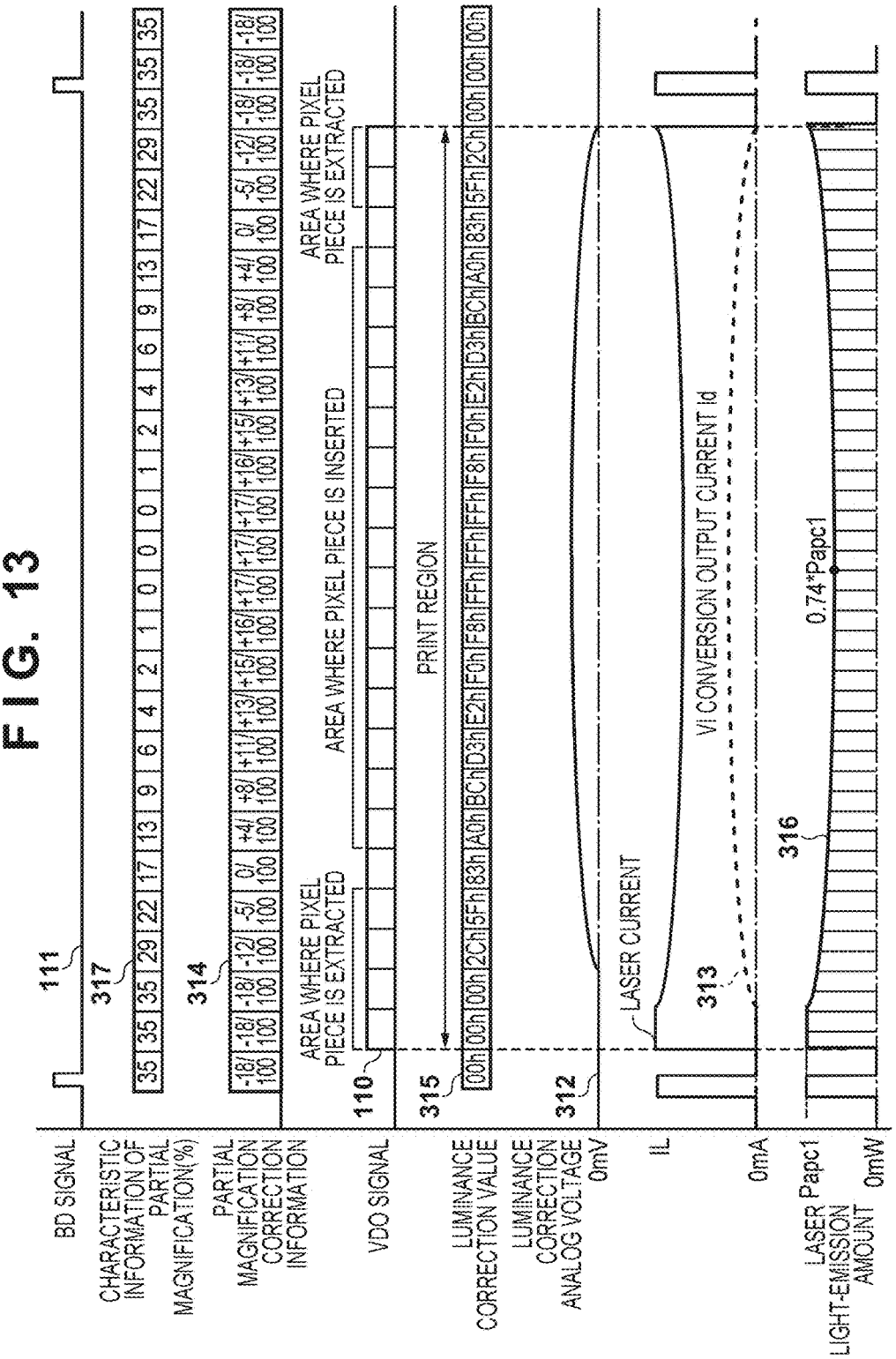
FIG. 13 is a time chart illustrating partial magnification correction and luminance correction according to an embodiment.

FIG. 13 is a timing chart illustrating the above-described partial magnification correction and luminance correction. Partial magnification information 317 of the optical scanning device 400 is stored in the memory 304 shown in FIG. 5. The partial magnification information 317 may be measured and stored in individual optical scanning devices 400 after assembly. When there are little variations among the individual devices, a representative characteristic may be stored without measuring the partial magnification information 317 separately. The CPU core 2 reads out the partial magnification information 317 from the memory 304 via serial communication 307, and sends out the partial magnification information 317 to the CPU 102 of the image signal generation unit 100. The CPU 102 generates partial magnification correction information 314 based on the partial magnification information 317, and sends the partial magnification correction information 314 to the frequency control unit 128 of the image modulation unit 101. FIG. 13 illustrates an exemplary case where a partial magnification of 35% occurs at the most off-axial image height relative to the axial image height as a reference. In the present example, the partial magnification correction information 314 is set such that with the magnification correction being zero for the 17% point, the magnification correction is −18% at the most off-axial image height, and the magnification correction is +17% at the axial image height. Accordingly, for the main scanning direction, the image length is shortened by extracting pixel pieces in the vicinity of the end portion in which the absolute value of the image height is large, and the image length is elongated by inserting pixel pieces in the vicinity of the center at which the absolute value of the image height is small, as shown in the drawing. As described with reference to FIGS. 11A and 11B, 18 sections of pixel pieces are extracted for 100 sections of pixel pieces in order to perform a correction of −18% at the most off-axial image height, and 17 sections of pixel pieces are inserted for 100 sections of pixel pieces in order to perform a correction of +17% at the axial image height. Consequently, when viewed with the vicinity of the axial image height (center) as a reference, the vicinity of the most off-axial image height (end portion) is in substantially the same state as a state in which 35 sections of pixel pieces have been extracted for 100 sections of pixel pieces, so that the partial magnification can be corrected by 35%. That is, the time period during which the spot of the light beam 208 is moved by one pixel width (42.3 um (600 dpi)) on the surface to be scanned 407 for the most off-axial image height is set to be 0.74 times that for the axial image height. Such insertion/extraction of pixel pieces corresponding to a width less than one pixel width makes it possible to correct the pixel width, and to form latent images corresponding to the respective pixels at substantially equal intervals for the main scanning direction.

Note that, taking the axial image height as a reference, the ratio of extracted pixel pieces may be increased as the image height approaches the most off-axial image height, without performing insertion or extraction of pixel pieces in the vicinity of the axial image height. Conversely, taking the most off-axial image height as a reference, the ratio of inserted pixel pieces may be increased as the image height approaches the axial image height, without performing insertion or extraction of pixel pieces in the vicinity of the most off-axial image height. However, as described above, the image quality becomes better when the insertion/extraction of pixel pieces is performed such that the pixels at an intermediate image height between the axial image height and the most off-axial image height corresponds to a reference pixel width (width corresponding to 16 pixel pieces). That is, the smaller the absolute value of the difference between the reference pixel width and the pixel width of the pixel in or from which pixel pieces have been inserted or extracted, the more faithful the image data to the original image data for the image density in the main scanning direction, so that a favorable image quality can be achieved.

Although the correction of the pixel width by insertion/extraction of pixel pieces has been described here, the pixel width may be corrected by changing the frequency in the respective sections as previously described. In the case of changing the frequency, all of the pixel pieces of one pixel composed of 16 pixel pieces can be used for the tone control as shown in FIG. 8B.

For the luminance correction, the partial magnification information 313 and the correction current information in the memory 304 are read out prior to image formation. Then, the CPU core 2 in the IC 3 generates a luminance correction value 315, and a luminance correction value 315 for one scan is saved in a register (not shown) located in the IC 3. An output voltage 23 of the regulator 22 is determined, and the determined output voltage 23 is input into the DA converter 21 as a reference voltage. Then, by reading out the luminance correction value 315 saved in the register (not shown) in synchronization with the BD signal 111, the luminance correction analog voltage 312 is sent from an output port of the DA converter 21 to the VI conversion circuit 306 in the subsequent stage, to convert the luminance correction analog voltage 312 into the current 313. As shown in FIG. 13, the luminance correction value 315 varies according to the change in the irradiation position (image height) of the laser light on the surface to be scanned, and therefore, the current value 313 is also changed according to the irradiation position of the laser light. Thus, the current IL is controlled.

The luminance correction value 315 generated by the CPU core 2 based on the partial magnification information 317 and the correction current information is set such that the current 313 decreases with an increase in the absolute value of the image height Y. Accordingly, as shown in FIG. 13, the current IL increases with an increase in the absolute value of the image height Y. In other words, while one scan is being performed, the current 313 changes, and the current IL decreases toward the image center portion (with a decrease in the absolute value of the image height Y). As a result, the laser light amount that is output by the light-emitting unit 11 is corrected such that, as shown in the drawing, light is emitted at the luminance Papc1 at the most off-axial image height, and light is emitted at a luminance that is 0.74 times the luminance Papc1 at the axial image height.

Figure 4A:
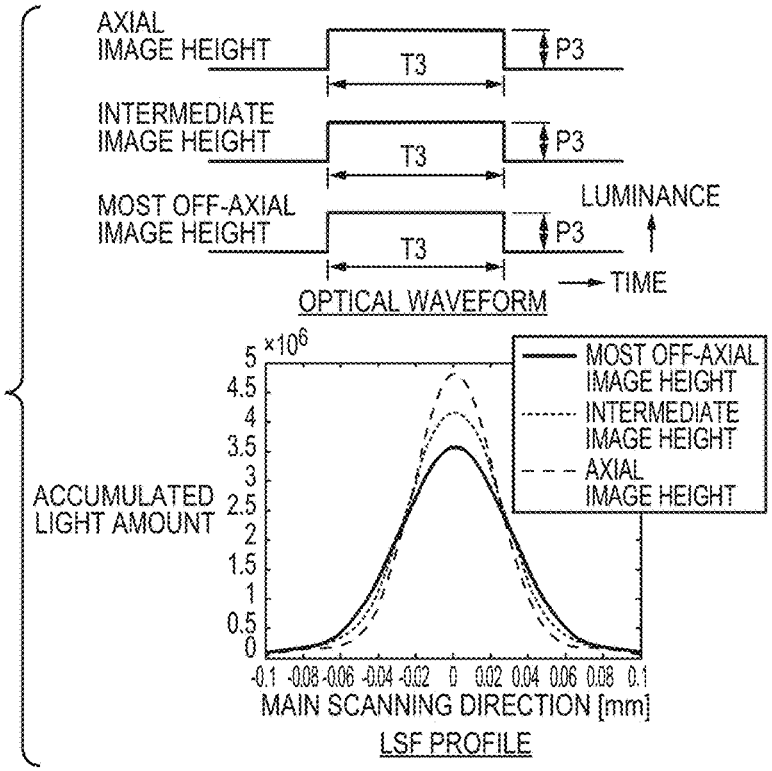
Figure 4B:
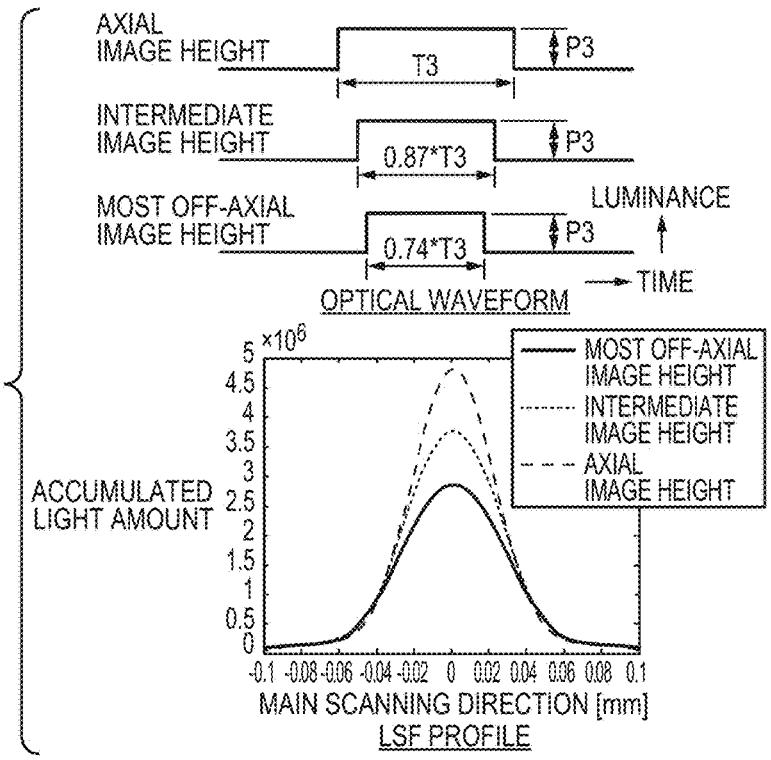

FIGS. 4A to 4C are diagrams showing optical waveforms and main scanning LSF (Line Spread Function) profiles. The optical waveforms and the main scanning LSF profiles are shown for cases where the light source 401 has emitted light at a predetermined luminance for a predetermined time period at the axial image height, an intermediate image height between the axial image height and the most off-axial image height), and the most off-axial image height, respectively. Note that in the optical configuration of the present embodiment, the scanning speed at the most off-axial image height is 135% of that at the axial image height, and the partial magnification at the most off-axial image height relative to the axial image height is 35%. The optical waveforms are emission waveforms of the light source 401. A main scanning LSF profile is a profile obtained by integrating a spot profile in the sub-scanning direction, the spot profile having been formed on the surface to be scanned 407 by emitting light with the above-described optical waveforms, while moving the spot in the main scanning direction. This represents the total exposure amount (integrated light amount) on the surface to be scanned 407 when the light source 401 is caused to emit light with the above-described optical waveforms.

FIG. 4A shows a state in which the above-described partial magnification correction and luminance correction are not performed. In FIG. 4A, the light source 401 emits light at a luminance P3 for a time period T3, regardless of the image height. Here, the time period T3 is a time period required to perform main scanning for one pixel (42.3 um) at the axial image height. In FIG. 4A, it can be seen that as the image height moves from the axial image height to the off-axial image height, the main scanning LSF profile is enlarged, and the peak of the accumulated light amount is reduced. FIG. 4B shows a case where only the partial magnification correction has been performed. That is, although the light source 401 emits light at the luminance P3 regardless of the image height, the light-emission time period is shortened in a direction from the axial image height toward the off-axial image height. In FIG. 4B, the enlargement of the main scanning LSF profile that occurs in a direction toward the off-axial image height is suppressed. However, it can be seen that since the light-emission time is shortened in a direction toward the off-axial image height, the peak of the accumulated light amount is further reduced as compared with that shown in FIG. 4A. FIG. 4C shows a case where the partial magnification correction and the luminance correction have been performed. That is, in a direction toward the off-axial image height, the light-emission time is shortened and the emission luminance of the light-emitting unit 11 is increased. In FIG. 4C, as compared with FIG. 4B, the reduction in the peak of the accumulated light amount that occurs in a direction toward the off-axial image height is suppressed and the enlargement is also suppressed. Although the LSF profiles at the axial image height, the intermediate image height, and the most off-axial image height shown in FIG. 4C do not completely match, the total exposure amounts to the pixels are substantially the same.

As described above, it is possible to perform exposure that prevents image degradation by performing the partial magnification correction and the luminance correction, without using a scanning lens having the fθ characteristic. However, as described above, in the case of performing the partial magnification correction and the luminance correction as well, the LSF profile at the axial image height and the LSF profile at the most off-axial image height do not completely match. Due to this LSF profile variation, the reproducibility of pixels is different for each position in the main scanning direction. In the following, this phenomenon will be described.

Figure 14:
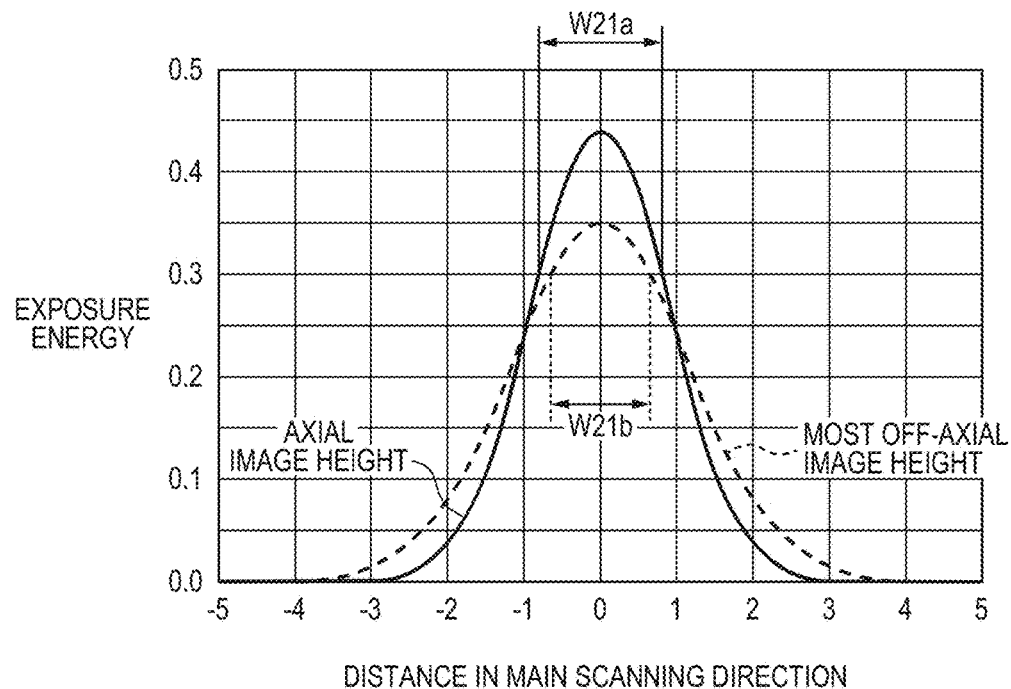
FIG. 14 is a diagram showing exposure energy distributions at an axial image height and a most off-axial image height according to an embodiment.

FIG. 14 shows an exposure energy distribution of isolated pixels when the partial magnification correction and the luminance correction have been performed. Note that in the present embodiment, an isolated pixel means a pixel to which toner is attached by being exposed. Blank pixels surrounding the isolated pixel means pixels to which toner is not attached by not being exposed, or pixels to which toner is not attached by being exposed with an exposure amount that does not cause the tonner to be attached to the pixel. The exposure energy distribution of the isolated pixel matches the LSF profile. Although the total sum (the integral value in the main scanning direction) of the exposure energy of the isolated pixels at the axial image height and that at the most off-axial image height are the same, the pixel diameters (spot diameters) are different. For example, it is assumed that, as shown in FIG. 14, one pixel width in the main scanning direction is "width when the exposure energy is 0.3". That is, toner is attached to a portion where the exposure energy applied to the photosensitive member 4 is 0.3 or more. In this case, a pixel width W21a at the most off-axial image height is wider than a pixel width W21b at the axial image height. Note that if it is assumed that one pixel width in the main scanning direction is "width when the exposure energy is 0.2", the magnitude relationship of widths between the most off-axial image height and the axial image height is reversed.

Figure 15:
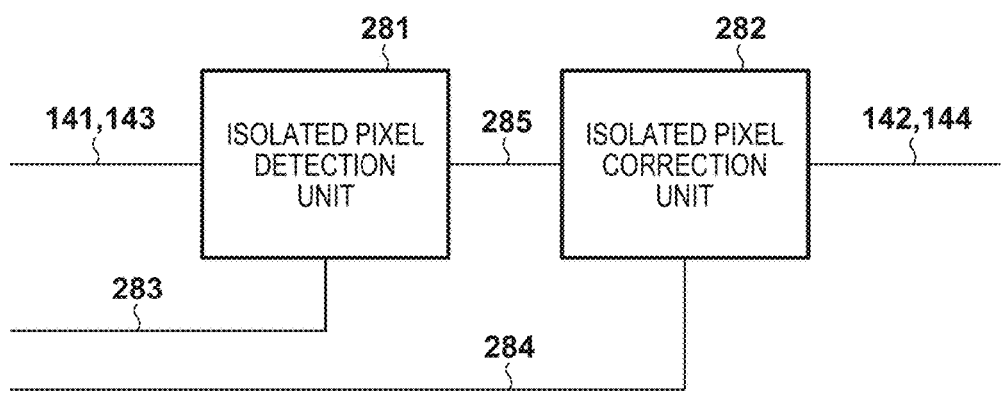
FIG. 15 is a block diagram of an isolated pixel control unit according to an embodiment.

FIG. 15 is a block diagram of the isolated pixel control unit 140 in the present embodiment. An isolated pixel detection unit 281 receives determination information 283 from the CPU 102 or a storage medium (not shown) provided in the image modulation unit 101, detects the presence or absence of any isolated pixels contained in the image data 141 or the image data 143, and outputs a detection signal 285 indicating a result of the detection. Note that the image data 141 is the density-corrected image data that is output by the density correction processing unit 121. The image data 143 is the image data that has been subjected to halftone processing, which is output by the halftone processing unit 122. That is, in the present embodiment, the isolated pixel control unit 140 performs processing on image data that has been subjected to density correction processing or halftone processing. Then, the isolated pixel correction unit 282 selects a correction target pixel from the blank pixels surrounding the isolated pixel indicated by the detection signal 285. Then, the isolated pixel correction unit 282 corrects the image data 141 or 143 so as to expose the pixel pieces of the selected correction target pixel, thus adjusting the size of the isolated pixel. Then, the isolated pixel correction unit 282 outputs the image data 142 or 144 that has been subjected to the isolated pixel correction processing. Note that the image data 142 is an output signal when the processing is performed on the image data 141, and the image data 144 is an output signal when the processing is performed on the image data 143. In the present embodiment, when isolated pixel correction processing is performed on the image data that has been subjected to density correction processing, the halftone processing is prohibited for the isolated pixel and the correction target pixel.

Figure 16A:
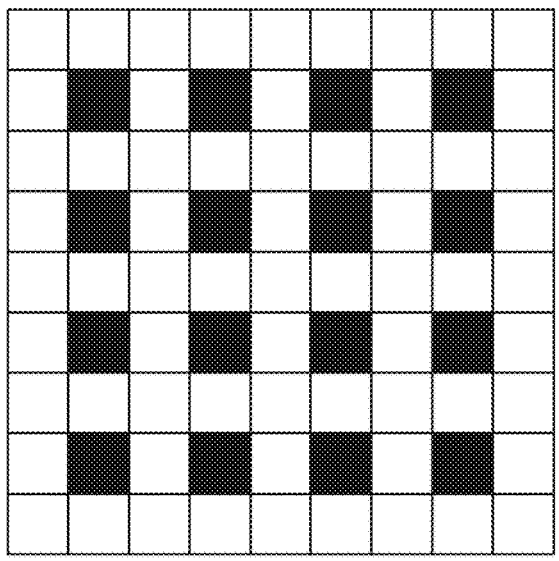
FIGS. 16A and 16B are diagrams showing images containing isolated pixels according to an embodiment.
Figure 16B:
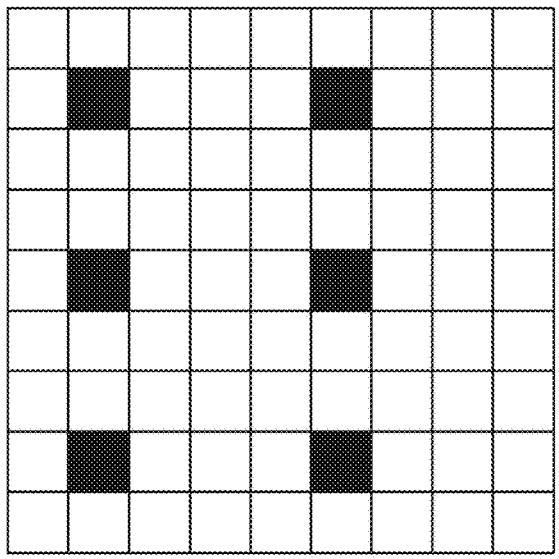
Figure 17A:
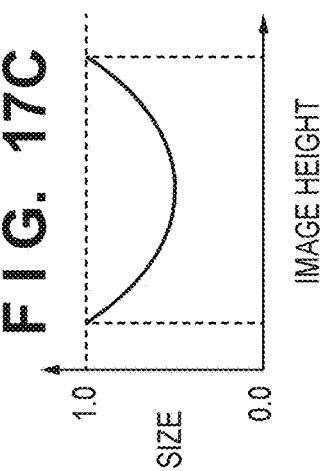
FIGS. 17A to 17C are diagrams showing a relationship between the image height and the pixel size according to an embodiment.
Figure 17B:
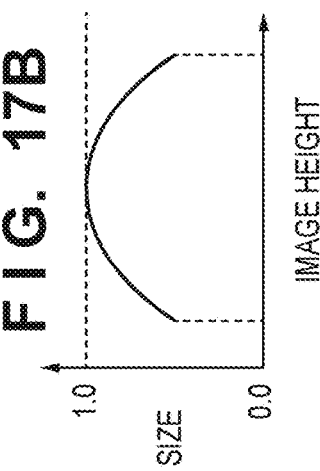
Figure 17C:
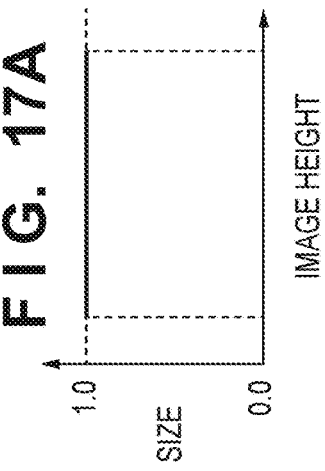

FIGS. 16A and 16B show examples of the isolated pixel. In FIGS. 16A and 16B, pixels with a black background are isolated pixels, and pixels with a white background are blank pixels. FIG. 16A shows a pattern in which two blank pixels are present between isolated pixels in the main scanning direction, and three blank pixels are present between isolated pixels in the sub-scanning direction. FIG. 16B shows a pattern in which one blank pixel is present between isolated pixels in each of the main scanning direction and the sub-scanning direction. FIG. 17B shows a relationship between the image height position and the pixel size when toner is attached to a region in which "exposure energy=0.3" or more. FIG. 17C shows a relationship between the image height position and the pixel size when toner is attached to a region where "exposure energy=0.2" or more. As shown in FIGS. 17B and 17C, the pixel size varies depending on the image height position. In the present embodiment, the correction is performed such that the pixel size is constant regardless of the image height position, as shown in FIG. 17A.

Figure 19A:
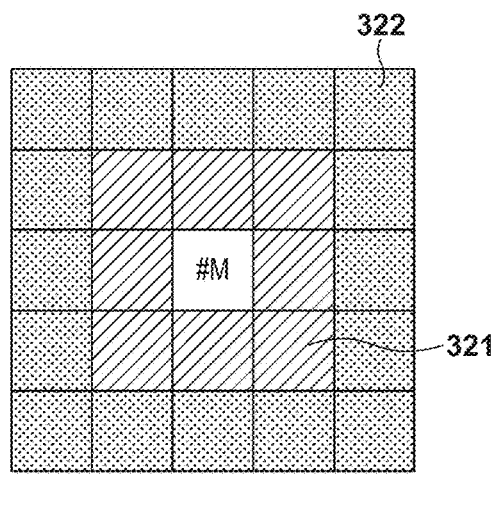
FIG. 19A is a diagram showing a method for determining isolated pixels according to an embodiment.

The isolated pixel detection unit 281 detects an isolated pixel based on determination information 283, which is a matrix including five pixels in each of the main scanning and sub-scanning directions, shown in FIG. 19A, for example. Specifically, when toner is attached to a pixel of interest #M and toner is not attached to the surrounding pixels 321, the pixel of interest #M is determined to be an isolated pixel. The isolated pixel detection unit 281 notifies the thus detected isolated pixel to the isolated pixel correction unit 282 by using the detection signal 285.

Figure 19B:
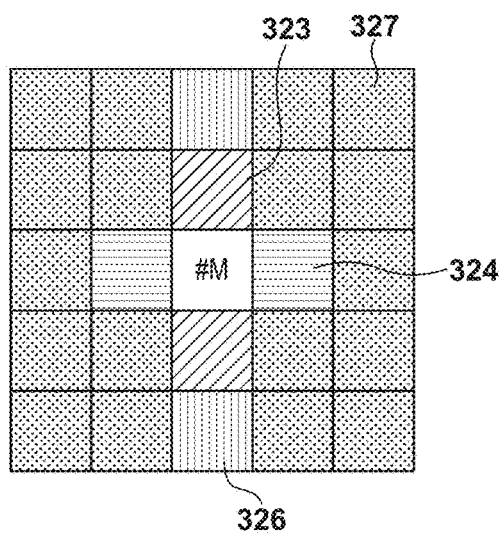
FIG. 19B is a diagram showing correction target pixels according to an embodiment.

The isolated pixel correction unit 282 selects a correction target pixel from two pixels 323 adjacent to the center pixel #M in the sub-scanning direction and two pixels 324 adjacent to the center pixel #M in the main scanning direction shown in FIG. 19B. That is, in the present example, the correction target pixel is selected from four blank pixels that are adjacent to the isolated pixel in the main scanning direction and the sub-scanning direction. However, it is possible to adopt a configuration in which the correction target pixel is selected from eight blank pixels located around the isolated pixel. Note that when a pixel 323 is selected as the correction target pixel, two pixels 326 that are adjacent to the pixel 323 in the sub-scanning direction are not selected as correction target pixels for the other isolated pixels. In the present example, toner is attached to a given one pixel, and, when the pixels surrounding the one pixel are blank pixels, the one pixel is determined to be an isolated pixel. However, when toner is not attached around 2×2 pixels, the 2×2 pixels may be collectively determined as isolated pixels.

Next, the isolated pixel correction unit 282 performs processing on the correction target pixel in accordance with the correction information 284 held by a storage unit (not shown) of the image signal generation unit 100. The correction information 284 is information indicating a relationship between the image height position and the size correction amount. For example, the information indicating the image height position and the pixel size shown in FIG. 17B or 17C is an example of the correction information 284. In FIG. 17B, the size at the axial image height is 1.0, and the size at the most off-axial image height is 0.5. In this case, based on the relationship shown in FIG. 17B, the isolated pixel correction unit 282 causes toner to be attached to the pixel pieces of the correction target pixel at the most off-axial image height, and thereby, it can be determined that the size of the isolated pixel is set to 1.0, or in other words, to be doubled. Although FIGS. 17B and 17C show the information relating to the width in the main scanning direction, this information is also applied to the width in the sub-scanning direction in the present example. However, correction information 284 indicating the image height position and the size correction amount in the main scanning direction and correction information 284 indicating the image height position and the size correction amount in the sub-scanning direction may be provided separately. Furthermore, for example, information indicating the image height position, the number of pixel pieces that are added to be exposed around that pixel for size adjustment, and the direction thereof can also be used as the correction information 284. Here, the direction of the added pixel pieces is the main scanning direction and the sub-scanning direction relative to the isolated pixel. However, in the case of selecting the correction target pixel from eight blank pixels surrounding the isolated pixel, an oblique direction can also be designated. Note that for an isolated pixel having a size of 1.0 at a position in the main scanning direction, the isolated pixel correction unit 282 does not select a correction target pixel for that isolated pixel, and therefore, does not change the size of the isolated pixel. Furthermore, in the present embodiment, the information indicating the relationship between the image height position and the pixel size is used as the correction information 284. However, another parameter relating to the variation in size of isolated pixels, including, for example, the angular speed of rotation or the like of the deflector 405 may be used in place of the image height as the correction information 284. Note that FIGS. 17B and 17C are merely examples, and, depending on the image height, the position at which the pixel size is maximum or minimum may be an intermediate image height.

FIG. 18A is an image in which the isolated pixels shown in FIG. 16A have been corrected, and FIG. 18B is an image in which the isolated pixels shown in FIG. 16B have been corrected. In the example shown in FIG. 18A, blank pixels located above and below (in the sub-scanning direction) and left and right (in the main scanning direction) of the isolated pixel are selected as correction target pixels, and thereby, the size of the isolated pixel is corrected. On the other hand, in the example shown in FIG. 18B, only blank pixels located left and right (in the main scanning direction) of the isolated pixel are selected as correction target pixels, and thereby, the size of the isolated pixel is corrected. First, the selection of a correction target pixel, and pixel pieces to which toner is attached in the correction target pixel will be described. Two blank pixels adjacent to the isolated pixel in the main scanning direction can always be selected as correction target pixels. However, pixel pieces to which toner is attached are selected so as not to be consecutive in the main scanning direction to pixel pieces of another pixel to which toner is attached. For example, as shown in FIGS. 18A and 18B, it is possible to adopt a configuration in which the size is adjusted by causing toner to be sequentially attached to pixel pieces consecutive to the isolated pixel. However, it is possible to adopt a configuration in which toner is attached to pixel pieces that are not consecutive to the isolated pixel in the main scanning direction as long as the pixel pieces are not consecutive to other pixel pieces to which toner is attached. For example, as shown in FIG. 18B, in the main scanning direction, the same blank pixel may be selected as the correction target pixels for different isolated pixels as long as the pixel pieces of the blank pixel are not consecutive to the pixel pieces of another pixel to which toner is attached.

On the other hand, blank pixels that are adjacent to the isolated pixel in the sub-scanning direction can be selected as correction target pixel when another pixel that is adjacent to these blank pixels in the sub-scanning direction does not include a pixel piece to which toner is attached. In FIG. 18A, each of the blank pixels that are adjacent to an isolated pixel in the sub-scanning direction is adjacent to another blank pixel in the opposite direction from the isolated pixel and therefore can be selected as a correction target pixel. In contrast, in FIG. 18B, each of the blank pixels that are adjacent to an isolated pixel in the sub-scanning direction is adjacent to another isolated pixel in the opposite direction from the isolated pixel, and therefore, is not selected as a correction target pixel. Note that as shown in FIG. 18A, it is possible to adopt a configuration in which, for a correction target pixel that is adjacent to an isolated pixel in the sub-scanning direction, the size is adjusted by adding, from the center portion, a pixel piece to which toner is attached. However, it is possible to adopt a configuration in which toner is attached from a pixel piece other than a pixel piece located at the center portion.

Note that the number of pixel pieces to which toner is attached is determined based on the correction information 284. Depending on the size correction amount, a blank pixel located obliquely above or obliquely below the isolated pixel may be selected as the correction target pixel. Within the limitation on the selection of the correction target pixel and the limitation on the pixel pieces to be exposed described above, pixel pieces are added within these limitations when the number of pixel pieces that is indicated by the correction information 284 cannot be added. For example, in FIG. 18B, blank pixels adjacent to the isolated pixel in the sub-scanning direction cannot be selected as correction target pixels, due to the limitation on the selection of the correction target pixel, and therefore, no pixel piece is added in the sub-scanning direction even when the correction information 284 indicates addition of pixel pieces in sub-scanning direction. In any case, of the pixel pieces of a correction target pixel for a given isolated pixel, a pixel piece to which toner is attached should not be adjacent to a pixel piece (including a pixel piece to which toner is attached for correction of another isolated pixel) of another pixel to which toner is attached.

By correcting the pixel size in the above-described manner, it is possible to suppress the variations in the reproducibility of pixels depending on the image height position. In the present embodiment, it is assumed that the imaging lens 406 of the optical scanning device 400 does not have the fθ characteristic, and therefore, the partial magnification correction processing and the luminance correction processing are performed. However, the present invention can be applied to an image forming apparatus including an optical scanning device in which the size of an isolated pixel that is formed by a pixel formed by a single or a plurality of pixels having a size less than or equal to a predetermined size changes according to the image height, regardless of the characteristics of the imaging lens 406.

Second Embodiment

Next, a second embodiment will be described, focusing on the difference from the first embodiment. In the first embodiment, when pixels surrounding one exposed pixel are pixels that are not exposed, the one exposed pixel is determined to be an isolated pixel. In the present embodiment, when one or a plurality of exposed pixels are present in a predetermined region and pixels surrounding the exposed pixel or pixels in the predetermined region are pixels that are not exposed, or in other words, blank pixels, the exposed pixel or pixels in the predetermined region are determined to be isolated pixels. FIG. 24 is a diagram illustrating isolated pixels according to the present embodiment. In the present embodiment, the predetermined region is set to be a region including two pixels in each of the main scanning direction and the sub-scanning direction. In a total of 26 pixel patterns shown in FIG. 24, black pixels indicate pixels that are exposed, or in other words, pixels to which toner is attached. Crosshatched pixels indicate pixels to which toner is not attached among the eight pixels surrounding the center pixel. White pixels indicate pixels that are other than the pixels surrounding the center pixel and to which toner is not attached. Vertically hatched pixels indicate pixels that are other than the pixels surrounding the center pixel and to which toner may or may not be attached. Each of the black pixels in the pixel patterns shown in FIG. 24 is in a region including two pixels (a total of four pixels) in the main scanning direction and the sub-scanning direction, and toner is not attached to the pixels surrounding the pixel. Accordingly, in the present embodiment, the isolated pixel detection unit 281 determines each of the pixels shown in black in FIG. 24 to be an isolated pixel.

Note that the predetermined region for determining the isolated pixel may be defined, for example, by an actual length, rather than the number of pixels. For example, the isolated pixel may be determined by using a rectangular region having a length of approximately 84.7 µm in each of the main scanning direction and the sub-scanning direction as the predetermined region. 84.7 µm is a length corresponding to 2 pixels in 600 dpi. Accordingly, in this case, as shown in FIG. 25A, a region of 2 pixels×2 pixels is used as the region for determining the isolated pixel. However, in the case of 300 dpi, the isolated pixel is determined for each region including one pixel, as shown in FIG. 25B. Furthermore, in the case of 1200 dpi, the isolated pixel is determined for each region including a total of 16 pixels, including 4 pixels×4 pixels, as shown in FIG. 25C. In the following, the present embodiment will be described, taking, as an example, a case in which the isolated pixel is determined for each region including 2 pixels×2 pixels, as shown in FIG. 24.

In the present embodiment as well, the isolated pixel detection unit 281 can detect an isolated pixel based on the determination information 283 in FIG. 19A, which is a matrix including five pixels in each of the main scanning and the sub-scanning directions, for example. Specifically, a pixel to which toner is attached is determined from a region including a total of four pixels, including two pixels in each of the main scanning direction and the sub-scanning direction, including a pixel of interest #M to which toner is attached. Then, if all of the pixel of interest #M to which toner is attached and the determined surrounding pixels to which toner is attached are blank pixels, the pixel of interest #M and the determined pixels to which toner is attached can be determined to be isolated pixels. Note that the method for determining the isolated pixel is not limited to the method using a matrix shown in FIG. 19A, and it is possible to use any algorithm.

In the present embodiment as well, a correction target pixel is selected from blank pixels surrounding an isolated pixel. However, not all the surrounding blank pixels can be selected as correction target pixels, and there is a limitation on the blank pixel that can be selected as a correction target pixel. In FIG. 24, crosshatched blank pixels indicate pixels that can be selected as correction target pixels. On the other hand, in FIG. 24, white pixels and vertically hatched pixels indicate pixels that cannot be selected as correction target pixels. Furthermore, the vertically hatched pixels indicate pixels that are not selected as correction target pixels for other isolated pixels. In this way, in the present embodiment, the pixel that can be selected as a correction target pixel is determined from among the surrounding blank pixels according to the pattern of isolated pixels that has been determined for each predetermined region. Note that pixels that can be selected as correction target pixels from among the surrounding blank pixels are indicated by the correction information 284. The number or the like of pixel pieces to be exposed of the correction target pixel is also indicated by the correction information 284 as in the first embodiment.

As described thus far, in the present embodiment, one or more exposed pixels in a predetermined region surrounded by blank pixels are selected as an isolated pixel group including one or more isolated pixels. Then, of the surrounding blank pixels, a correction target pixel is selected from a predetermined blank pixel that is determined by a pattern of the isolated pixel group. Then, by exposing the pixel pieces of the selected correction target pixel, the size of the isolated pixel group is adjusted. Note that information as to from which blank pixel the correction target pixel is to be selected, and information as to which pixel piece of the correction target pixel is to be exposed are indicated by the correction information 284. In the case of exposing pixels located in a small region surrounded by blank pixels, the spot diameters of these pixels to be exposed vary even when the partial magnification correction and the luminance correction are performed as in the case of the isolated pixel in the first embodiment. Accordingly, the variations in the pixel reproducibility depending on the image height position can be suppressed by correcting the sizes of the isolated pixels.

Third Embodiment

Figure 20:
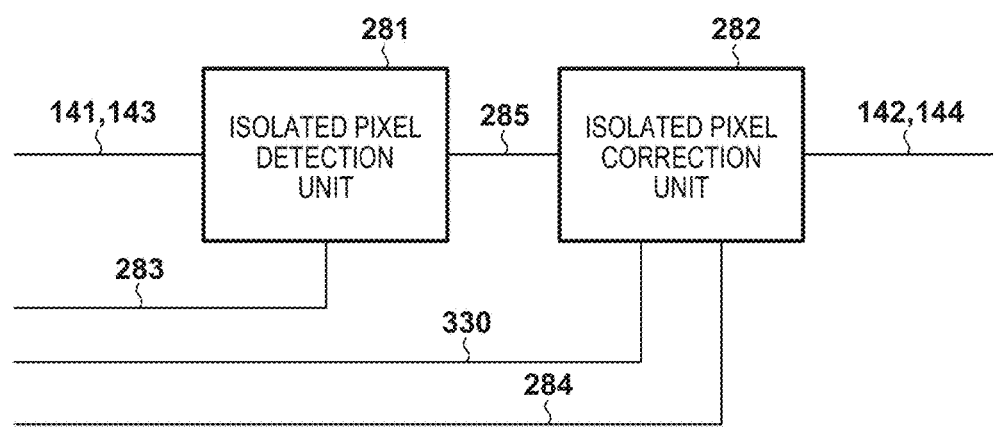
FIG. 20 is a block diagram of an isolated pixel control unit according to an embodiment.
Figures 21, 22A, 22B, 22C:
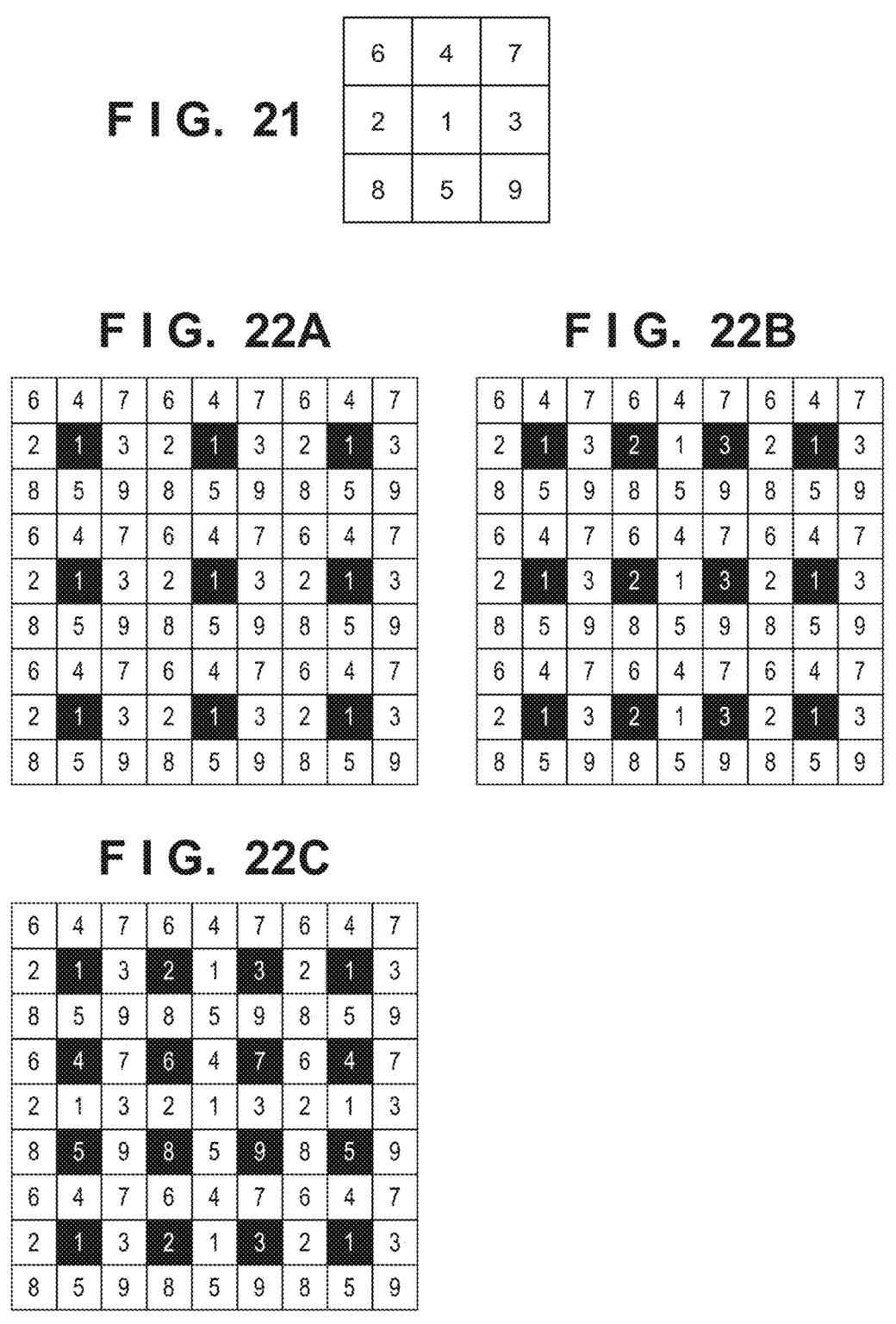

Next, a third embodiment will be described, focusing on the difference from the first embodiment. Note that the partial magnification correction processing and the luminance correction processing in the present embodiment are the same as those in the first embodiment. FIG. 20 is a block diagram of an isolated pixel control unit 140 according to the present embodiment. The portions that are same as those of the isolated pixel control unit 140 of the first embodiment shown in FIG. 15 are denoted by the same reference numerals, and the description thereof has been omitted. In the present embodiment, for the selection of the correction target pixel, the isolated pixel correction unit 282 uses rank information 330 saved in the storage unit (not shown) of the image signal generation unit 100. FIG. 21 shows an example of the rank information 330. The rank information 330 shown in FIG. 21 corresponds to the order of screen growth in the halftone processing shown in FIG. 8A. That is, the rank information 330 corresponds to the order of adding pixel pieces to which toner is attached according to an increase in the density. FIGS. 22A to 22C show examples of an image containing isolated pixels. In FIGS. 22A to 22C, pixels with a black background are isolated pixels, pixels with a white background are blank pixels, and the number in each of the pixels is the rank in the order of the screen growth that is indicated by the rank information 330.

Figures 23A, 23B, 23C, 23D, 23E:
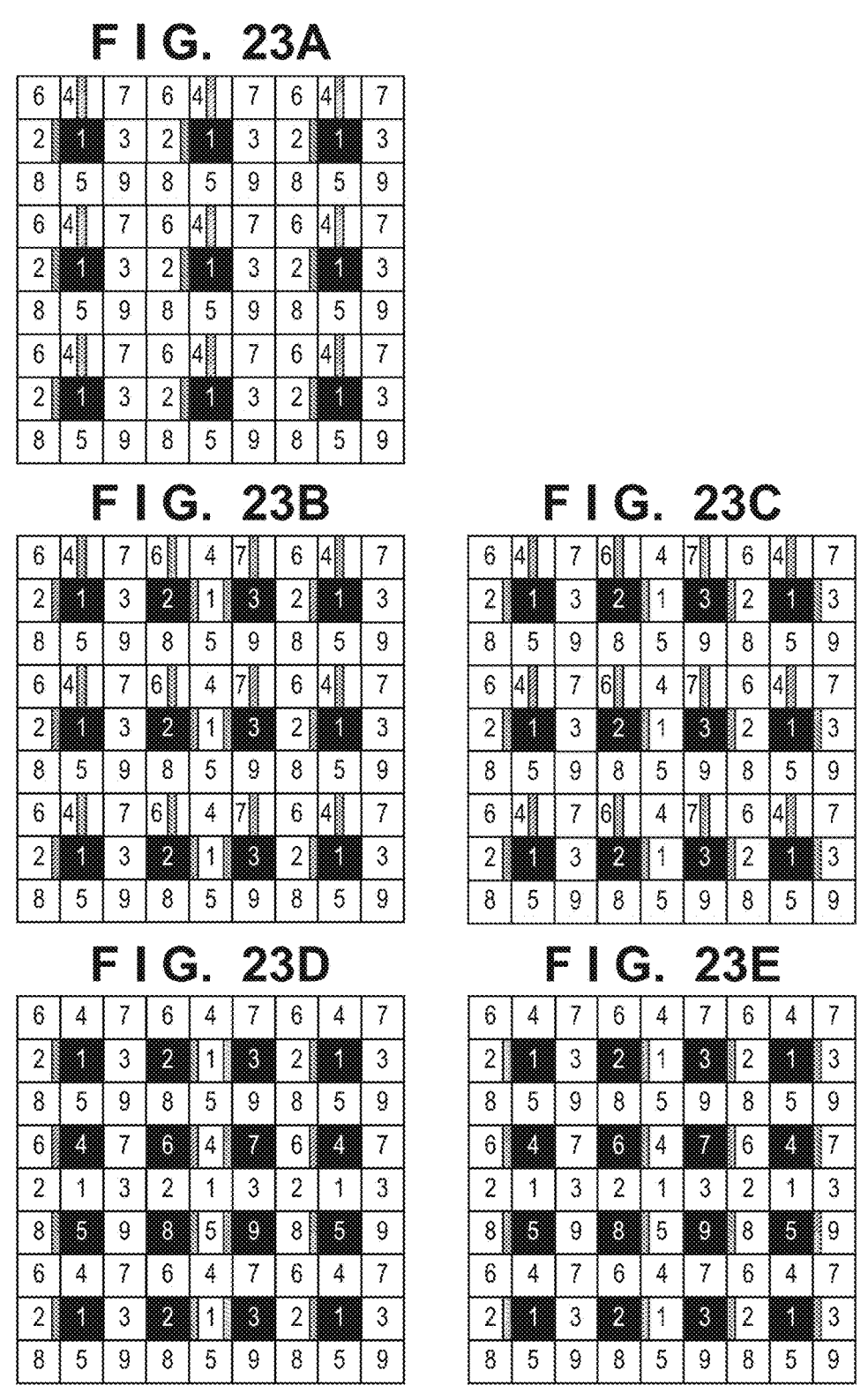

In the present embodiment, the rank information 330 is used in order to determine a correction target pixel from blank pixels surrounding an isolated pixel. FIGS. 23A to 23E show images of correction of isolated pixels for FIGS. 22A to 22C, respectively. FIG. 23A is an image of correction for FIG. 22A, FIGS. 23B and 23C are images of correction for FIG. 22B, and FIGS. 23D and 23E are images of correction for FIG. 22C.

As shown in FIG. 23A, in the present embodiment, the pixel that is placed earlier in the order of the pixels located to the left and the right of the isolated pixel, and the pixel that is placed earlier in the order of the pixels located above and below the isolated pixel are basically selected as correction target pixels. For example, in FIG. 23A, the pixel located to the left of an isolated pixel and the pixel located above the isolated pixel are selected as correction target pixels. FIG. 23B also shows a case where the correction target pixels are determined in the same manner as FIG. 22A.

On the other hand, in FIG. 23B, the blank pixel between the second isolated pixel and the third isolated pixel from the left in the main scanning direction is a correction target pixel for each of the second isolated pixel and the third isolated pixel. In this case, for example, as shown in FIG. 23C, it is possible to adopt a configuration in which one blank pixel is not used for two different correction target pixels. For example, for the second isolate pixel in FIG. 23C, a blank pixel having a rank of 1 is selected as a correction target pixel in the main scanning direction. As a result, for the third isolated pixel, a blank pixel having a rank of 2 is selected as a correction target pixel in the main scanning direction, instead of using a blank pixel having a rank of 1.

FIG. 23D is an image of correction corresponding to the pixel pattern shown in FIG. 22C. As described above, when a blank pixel located in the up-down direction is selected as a correction target pixel, the region in which toner is attached becomes consecutive to the region of another pixel to which toner is attached, and therefore, a blank pixel located in the up-down direction is not selected as a correction target pixel. The rest of the configuration is the same as that shown in FIG. 23A. On the other hand, FIG. 23E shows a case where the correction target pixel is determined such that one blank pixel will not be selected as a correction target pixel for two different isolated pixels.

As described above, in the present embodiment, the correction target pixel is selected based on the order indicated by the rank information 330. By setting the rank information 330 so as to correspond to the order of screen growth used in halftone processing, it is possible to correct the size of the isolated pixel by using a pixel piece located at an appropriate position taking halftone processing into consideration, and therefore, it is possible to achieve a favorable image quality. Note that the present embodiment is also applicable to a case where one or plurality of pixels to be exposed in a predetermined region surrounded by blank pixels is selected as isolated pixels, as described in the second embodiment. Specifically, the correction target pixel is sequentially selected from the pixel placed in the earliest in the order of screen growth in halftone processing.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091656, filed on Apr. 28, 2016 and Japanese Patent Application No. 2016-229191, filed on Nov. 25, 2016 which are hereby incorporated by reference herein in their entirety.

What is claimed is:

1. An image forming apparatus comprising:
   a photosensitive member;
   an exposure unit configured to divide one pixel into a plurality of pixel pieces and perform exposure on a pixel piece-by-pixel piece basis, to form an electrostatic latent image on the photosensitive member;
   a determination unit configured to determine, based on image data, an isolated pixel surrounded by blank pixels in the electrostatic latent image;
   a selection unit configured to select a correction target pixel from the blank pixels surrounding the isolated pixel; and
   a correction unit configured to correct the image data so as to expose a pixel piece of the correction target pixel.

2. The image forming apparatus according to claim 1, wherein the determination unit is further configured to, when pixels surrounding one exposed pixel are blank pixels, determine the one exposed pixel to be the isolated pixel.

3. The image forming apparatus according to claim 1, wherein
the determination unit is further configured to, when a plurality of exposed pixels are present in a predetermined region and pixels surrounding the plurality of exposed pixels are blank pixels, determine the plurality of exposed pixels to be the isolated pixel.

4. The image forming apparatus according to claim 1, wherein
the selection unit is further configured to select a correction target pixel from blank pixels that are adjacent to the isolated pixel in a main scanning direction and a sub-scanning direction.

5. The image forming apparatus according to claim 1, further comprising
a storage unit configured to hold information indicating a relationship between a position of a pixel in a main scanning direction and a correction amount of a size of the pixel, wherein
the selection unit is further configured to, based on a position of the isolated pixel in the main scanning direction and the information held by the storage unit, determine whether the isolated pixel is a size correction target, and select the correction target pixel if the isolated pixel is the size correction target.

6. The image forming apparatus according to claim 5, wherein
the correction unit is further configured to, based on the information held by the storage unit, determine a pixel piece to be exposed of the correction target pixel.

7. The image forming apparatus according to claim 5, wherein
the correction unit is further configured to determine a pixel piece to be exposed of the correction target pixel such that the pixel piece to be exposed of the correction target pixel is not adjacent to a pixel piece to be exposed of a pixel different from the isolated pixel adjacent to the correction target pixel.

8. The image forming apparatus according to claim 6, wherein
the correction unit is further configured to, when the correction target pixel is a pixel adjacent to the isolated pixel in the main scanning direction, select the pixel piece to be exposed of the correction target pixel in order from a pixel piece adjacent to the isolated pixel.

9. The image forming apparatus according to claim 8, wherein
the correction unit is further configured to, based on the information stored in the storage unit, determine the number of pixel pieces of the correction target pixel that are to be exposed in order from the pixel piece adjacent to the isolated pixel.

10. The image forming apparatus according to claim 1, wherein
the correction unit is further configured to, when the correction target pixel is a pixel adjacent to the isolated pixel in a sub-scanning direction, select a pixel piece to be exposed of the correction target pixel from a pixel piece at a center portion.

11. The image forming apparatus according to claim 1, wherein
a number of pixel pieces to be exposed of the correction target pixel is determined according to a position of the isolated pixel in a main scanning direction.

12. The image forming apparatus according to claim 1, wherein
the selection unit is further configured to select the correction target pixel from blank pixels surrounding the isolated pixel according to a predetermined rank.

13. The image forming apparatus according to claim 1, wherein
the selection unit is further configured not to select, as the correction target pixel, from among blank pixels adjacent to the isolated pixel in a sub-scanning direction, a blank pixel adjacent, in the sub-scanning direction, to another pixel including pixel pieces to be exposed.

14. The image forming apparatus according to claim 1, wherein
the determination unit is further configured to determine the isolated pixel in the electrostatic latent image based on image data that has been subjected to density correction processing, and
the correction unit is further configured to correct the image data that has been subjected to the density correction processing.

15. The image forming apparatus according to claim 14, further comprising
a processing unit configured to perform halftone processing on image data that has been corrected by the correction unit, wherein
the processing unit is further configured not to subject the isolated pixel and the correction target pixel to the halftone processing.

16. The image forming apparatus according to claim 15, wherein
the exposure unit is further configured to form the electrostatic latent image on the photosensitive member by scanning, with light, the photosensitive member in a main scanning direction based on image data that has been subjected to halftone processing performed by the processing unit,
a scanning speed of the light is not constant, and
the exposure unit is further configured to adjust a luminance of the light according to a scanning position of the light in the main scanning direction, and perform insertion and extraction of a pixel piece.

17. The image forming apparatus according to claim 1, wherein
the determination unit is further configured to determine the isolated pixel in the electrostatic latent image based on image data that has been subjected to density correction processing and halftone processing, and
the correction unit is further configured to correct the image data that has been subjected to the density correction processing and the halftone processing.

18. The image forming apparatus according to claim 17, wherein
the exposure unit is further configured to form the electrostatic latent image on the photosensitive member by scanning, with light, the photosensitive member in a main scanning direction based on image data that has been corrected by the correction unit,
a scanning speed of the light is not constant, and
the exposure unit is further configured to adjust a luminance of the light according to a scanning position of the light in the main scanning direction, and perform insertion and extraction of a pixel piece.

19. The image forming apparatus according to claim 1, wherein the isolated pixel is a pixel to which toner is attached by being exposed, and the blank pixels are pixels to which the toner is not attached by not being exposed or by being exposed with an exposure amount that does not cause the toner to be attached.

\* \* \* \* \*